United States Patent
Ozawa et al.

(10) Patent No.: US 12,462,320 B2
(45) Date of Patent: Nov. 4, 2025

(54) SYSTEMS AND METHODS FOR EXTENDING SELECTABLE OBJECT CAPABILITY TO A CAPTURED IMAGE

(71) Applicant: Adeia Guides Inc., San Jose, CA (US)

(72) Inventors: Toshiro Ozawa, Irvine, CA (US); Ning Xu, Irvine, CA (US); Serhad Doken, Bryn Mawr, PA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/526,971

(22) Filed: Dec. 1, 2023

(65) Prior Publication Data
US 2025/0182234 A1 Jun. 5, 2025

(51) Int. Cl.
*G06T 1/00* (2006.01)
*G06T 3/40* (2006.01)
*G06T 7/70* (2017.01)

(52) U.S. Cl.
CPC .............. *G06T 1/0021* (2013.01); *G06T 3/40* (2013.01); *G06T 7/70* (2017.01)

(58) Field of Classification Search
None
See application file for complete search history.

(56) References Cited

U.S. PATENT DOCUMENTS

| | | |
|---|---|---|
| 7,949,149 B2 | 5/2011 | Rhoads et al. |
| 10,440,435 B1 | 10/2019 | Erdmann et al. |
| 2007/0047442 A1 | 3/2007 | Snyder |
| 2009/0012944 A1* | 1/2009 | Rodriguez .......... G06F 16/5866 |
| 2014/0086445 A1 | 3/2014 | Brubeck et al. |
| 2014/0098985 A1 | 4/2014 | Brubeck |
| 2023/0022018 A1 | 1/2023 | Spaulding et al. |
| 2023/0289384 A1 | 9/2023 | Pulicharla et al. |
| 2023/0377055 A1* | 11/2023 | Vudathu ............ G06V 30/1452 |
| 2024/0364970 A1 | 10/2024 | Coskun et al. |

FOREIGN PATENT DOCUMENTS

| | | |
|---|---|---|
| KR | 102180924 B1 | 11/2020 |
| WO | 2023/027754 A1 | 3/2023 |

OTHER PUBLICATIONS

Daniel Kim, "How Netflix protects its content—Part 2" (Published in PallyCon May 7, 2019), (https://medium.com/pallycon/how-netflix-protects-contents-part-2-33c1b60002a3).

(Continued)

*Primary Examiner* — Lennin R Rodriguezgonzalez
(74) *Attorney, Agent, or Firm* — HALEY GUILIANO LLP

(57) ABSTRACT

Systems, methods, and apparatuses are described herein for obtaining an image, wherein the image includes a digital watermark that embeds metadata associated with at least one object in the image, and wherein the metadata comprises an indication of a location of the at least one object in the image. The embedded metadata may be extracted based on the digital watermark. Based on the extracted metadata, a portion of the image corresponding to the location of the at least one object in the image may be caused to be selectable to access supplemental information related to the at least one object.

20 Claims, 8 Drawing Sheets

(56) References Cited

OTHER PUBLICATIONS

Jobin Abraham et al. "An imperceptible spatial domain color image watermarking scheme" (Journal of King Saud University, vol. 31, Issue 1, Jan. 2019, pp. 125-133), (https://www.sciencedirect.com/science/article/pii/S1319157816301483)(21 pages).
Johan Kölhi, et al., "Systems and Methods for Levaraging Machine Learning To Enable User-Specific Real-Time Information Services for Identifiable Objects Within a Video Stream", (U.S. Appl. No. 18/102,230), filed Jan. 27, 2023).
Johan Kölhi, et al., "Systems and Methods for Levaraging Machine Learning To Enable User-Specific Real-Time Information Services for Identifiable Objects Within a Video Stream", (U.S. Appl. No. 18/102,233), filed Jan. 27, 2023).
Wadheraa et al., "A Comprehensive Review on Digital Image Watermarking" (WCNC-2021: Workshop on Computer Networks & Communications, May 1, 2021, Chennai, India.), (https://arxiv.org/ftp/arxiv/papers/2207/2207.06909.pdf), (18 pages).
Wikipedia, "QR code" (https://en.wikipedia.org/wiki/QR_code), (30 pages).
Create Short URLs (https://t.ly/), (T.LY is the World's Shortest Link Shortener service to track, brand, and share short URLs),(4 pages).
U.S. Appl. No. 18/990,746, filed Dec. 20, 2024. Title: Systems and Methods for Extending Selectable Object Capability to a Captured Image Using an Alteration Pattern.

\* cited by examiner

SYSTEMS AND METHODS FOR EXTENDING SELECTABLE OBJECT CAPABILITY TO A CAPTURED IMAGE

BACKGROUND

The present disclosure is directed to systems and methods for extending selectable object capability to a captured image. More particularly, techniques are disclosed for modifying an image by applying a digital watermark to the image to cause metadata to be embedded into the image, and extracting the metadata embedded in a captured image of the image (captured based on a screen capture or using a camera), to enable access to supplemental content related to a selectable object in the image.

SUMMARY

Modern media distribution systems enable a user to access more media content than ever before, and on more devices than ever before. Media content may include a variety of supplemental content or interactive content, related to the media content, that may enhance the user experience and allow users to better interact with the media content. For example, when accessing content on Amazon Prime Video, if a user pauses the content, Amazon's X-Ray function provides access to additional information for the content, such as cast information for a current scene of the content. However, if an image or video of the current scene of the media content is captured, such as by a smartphone, this functionality provided by Amazon X-Ray would be lost. That is, while viewing the captured video or image of the Amazon Prime Video content, if the user (or the user's friend with whom the captured content may have been shared) pauses the captured video on his or her smartphone, such pausing action would not trigger the presentation of any additional information (such as cast information) at the smartphone, and the user would not be able to interact with content of the displayed video or image. In such an approach, metadata associated with this additional content is stored in a separate file than the media content, and since capturing an image or video of only the media content eliminates the ability to take advantage of any additional content associated with the media content, such approach lacks the ability to maintain any selectable object functionality (present in an original image or video) in a captured image or video of the media content.

In another approach, "second screen" applications employ simultaneous use of a supplementary device, such as a smartphone or tablet, to enhance the viewing experience of primary content on another device, such as a television. However, it may be burdensome and distracting for a user to utilize two separate devices in this manner, as well as requiring use of additional computing and/or networking resources to provide such content to multiple devices. Moreover, if the primary content changes, the supplementary content's relevance can diminish and may not be updated to maintain its relevance to the current primary content.

To help address these problems, systems, methods, and apparatuses are disclosed herein for obtaining an image, wherein the image includes a digital watermark that embeds metadata associated with at least one object in the image, wherein the metadata comprises an indication of a location of the at least one object in the image. The systems, methods, and apparatuses disclosed herein may be further configured to extract, based on the digital watermark, the embedded metadata, and based on the extracted metadata, cause a portion of the image corresponding to the location of the at least one object in the image to be selectable to access supplemental information related to the at least one object.

In addition, to help address the aforementioned problems, systems, methods, and apparatuses are disclosed herein for identifying an image comprising at least one object, wherein a portion of the image corresponding to the at least one object is selectable to access supplemental information related to the at least one object. The image may be modified by applying a digital watermark to the image to cause metadata to be embedded into the image, wherein the metadata comprises an indication of a location of the at least one object in the image. In some embodiments, modifying the image enables extracting, from a captured image of the modified image captured using a camera or based on a screen capture of the modified image, the metadata embedded in the modified image based on the applied digital watermark, and based on metadata extracted from the captured image, causing a portion of the captured image corresponding to the at least one object to be selectable to access the supplemental information related to the at least one object. In some embodiments, the supplemental information may store, for example, a number of selectable objects, their sizes and/or colors, or any other suitable data, or any combination thereof.

Such aspects enable utilizing digital watermarking technology to maintain selectable object or item functionality for a captured video or image, even after such image is screen captured, stored, shared, or printed. For example, when the image or video is displayed on a computing device display providing for selectable object interaction, the objects and/or items in the image or video can still be selectable to access supplemental content (e.g., a uniform resource locator (URL) providing access to content related to the selected object) based on metadata (e.g., indicating a location of the particular object) embedded as a digital watermark in the image, without requiring receipt of a separate metadata file, thereby conserving computing and/or networking resources. Moreover, while second screen apps rely on delivering supplementary content on a separate device from a primary device displaying primary content, the techniques described herein enable embedding crucial information directly within primary visual or other content, to ensure that such data remains an intrinsic part of the content, irrespective of how it's captured, stored, and shared. As a result, users can directly interact with objects in the content to access additional information or links, providing a more integrated and intuitive experience, and providing a more streamlined and cohesive user experience by enhancing the content itself, rather than adding a parallel content stream, which may consume more computing and/or networking resources.

In some embodiments, obtaining the image comprises capturing the image using a camera, and the method further comprises determining that the image is a captured image of content being displayed on a display of a device, and identifying, in the captured image, boundaries of the display; and based on the extracted metadata and the identified boundaries of the display, determining a location of the at least one object in the captured image.

In some embodiments, determining the location of the at least one object in the captured image further comprises projecting, based on the identified boundaries of the display, the captured image to an image depicting a larger portion of the display than the captured image, and determining the location of the at least one object in the captured image based at least in part on the image depicting the larger portion of the display than the captured image.

In some embodiments, the at least one object is a particular object, and the image comprises a plurality of objects including the particular object; and for each respective object of the plurality of objects, a digital watermark embeds metadata at a portion of the image that is in a vicinity of a location of the respective object in the image, and the metadata comprises an indication of a location of the respective object of the plurality of objects. In some embodiments, extracting the embedded metadata comprises extracting only the embedded metadata associated with the particular object. In some embodiments, the captured image comprises a zoomed-in portion of the image that depicts at least a portion of the particular object and that does not depict the other objects of the plurality of objects included in the image.

In some embodiments, the systems and methods described herein may be further configured to determine a location of the at least one object in the captured image at least in part by accessing the supplemental information related to the particular object to determine a type of the particular object, and performing image processing on the captured image to identify an object that corresponds to the determined type as the particular object.

In some embodiments, obtaining the image comprises obtaining a captured image of the image using a camera or based on a screen capture, and the metadata further comprises parental control information related to the image. In some embodiments, the image is included in a video, and the captured image is included in a captured recording of the video, and the systems and methods described herein may be further configured to extract the metadata by extracting the parental control information, and determine whether to permit playback of the recording of the video based on the extracted parental control information.

In some embodiments, the metadata disclosed herein, embedded into the image by way of a digital watermark, further comprises a URL that is selectable to access the supplemental information. In some embodiments, an indication of the applied digital watermark is not visible in the modified image.

In some embodiments, the at least one object is a particular object, and the image comprises a plurality of objects including the particular object. The systems, methods, and apparatuses described herein may further comprise modifying the image by applying a plurality of digital watermarks to the image to cause metadata to be embedded at a plurality of portions the image, wherein for each respective object of the plurality of objects, the metadata is embedded at a portion of the image that is in a vicinity of a location of the respective object in the image, and the metadata comprises an indication of a location of the respective object of the plurality of objects.

In some embodiments, the image is included in a video, and applying the digital watermark to the video further comprises causing at least a portion of the metadata to be embedded in audio information of the video.

In some embodiments, modifying the image by applying the digital watermark to the image is performed prior to encoding the modified image and prior to transmitting or storing the modified image.

In some embodiments, the systems, methods, and apparatuses described herein may further comprise identifying a discrepancy between a portion of the image and information in the supplemental information that is related to the portion of the image, and, based on the identified discrepancy, replacing the portion of the captured image with the information in the supplemental information that is related to the portion of the image.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
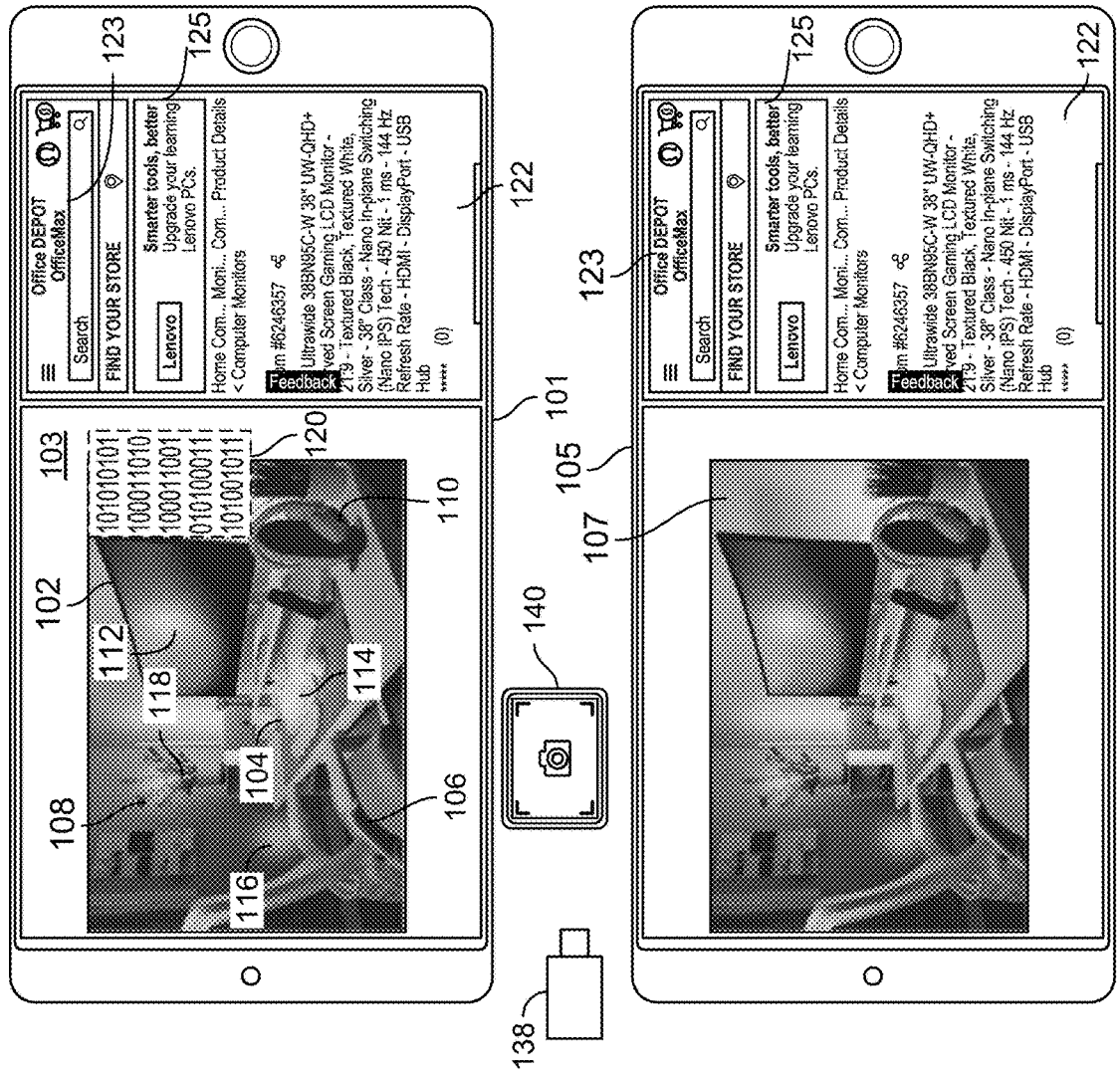
FIG. 1 shows an illustrative process for extending selectable object capability to a captured image, in accordance with some embodiments of this disclosure.
Figure 1:
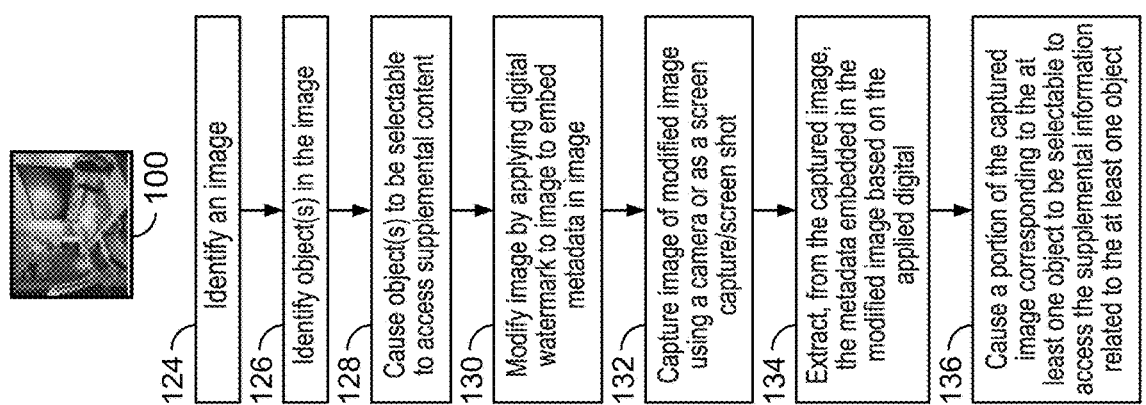

FIG. 1 shows an illustrative process for extending selectable object capability to a captured image, in accordance with some embodiments of this disclosure. At 124, a media application may identify image 100. In some embodiments, the media application may be executed at least in part on computing device 101 and/or at one or more remote servers and/or at or distributed across any of one or more other suitable computing devices, in communication over any suitable type of network (e.g., the Internet). The media application may be configured to perform the functionalities (or any suitable portion of the functionalities) described herein. In some embodiments, the media application may be a stand-alone application, or may be incorporated (e.g., as a plugin) as part of any suitable application, e.g., one or more broadcast content provider applications, broadband provider applications, live content provider applications, content provider applications, media asset provider applications, extended reality (XR) applications, video or image or electronic communication applications, social networking applications, image or video capturing and/or editing applications, content creation applications, or any other suitable application(s), or any combination thereof.

In some embodiments, the media application may be installed at or otherwise provided to a particular computing device, may be provided via an application programming interface (API), or may be provided as an add-on application to another platform or application. In some embodiments, software tools (e.g., one or more software development kits, or SDKs) may be provided to any suitable party, to enable the party to implement the functionalities described herein.

As referred to herein, the terms "media asset" and "content" may be understood to mean electronically consumable user assets, such as 3D content, television programming, as well as pay-per-view programs, on-demand programs (as in video-on-demand (VOD) systems), live content, Internet content (e.g., streaming content, downloadable content, Webcasts, etc.), video clips, audio, content information, pictures, GIFs, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, transmitted to, processed, displayed and/or accessed by a computing device, and/or can be part of a live performance or live event. In some embodiments, the media asset may be generated for display from a broadcast or stream received at a computing device, or from a recording stored in a memory of the computing device and/or a remote server.

XR may be understood as virtual reality (VR), augmented reality (AR) or mixed reality (MR) technologies, or any suitable combination thereof. VR systems may project images to generate a three-dimensional environment to fully immerse (e.g., giving a user a sense of being in an environment) or partially immerse (e.g., giving the user the sense of looking at an environment) users in a three-dimensional, computer-generated environment. Such environment may include objects or items that the user can interact with. AR systems may provide a modified version of reality, such as enhanced or supplemental computer-generated images or information overlaid over real-world objects. MR systems may map interactive virtual objects to the real world, e.g., where virtual objects interact with the real world or the real world is otherwise connected to virtual objects.

Computing device 101 (and/or computing device 105) may comprise or correspond to, for example, a mobile device such as, for example, a smartphone or tablet; a laptop computer; a personal computer; a desktop computer; a display device associated with local/in-premise computing resources and/or cloud computing resources or any other suitable display device; a non-smart, "dumb" television, display or monitor and/or thin client; a smart television; a smart watch or wearable device; a camera; smart glasses; a stereoscopic display; a wearable camera; XR glasses; XR goggles; XR head-mounted display (HMD); near-eye display device; a set-top box; a streaming media device; or any other suitable computing device; or any combination thereof.

At 124, media application may access, receive and/or cause to be generated for display image 100. For example, the media application may access image 100 over a network (e.g., communication network 709 of FIG. 7 or any other suitable network) from any suitable source (e.g., media content source 702 and/or server 704 of FIG. 7, or any other suitable data source, or any combination thereof). In some embodiments, the media application may capture an image or video of a real-world environment external to computing device 101 to obtain image 100, or perform a screen capture. Additionally or alternatively, the media application may access image 100 by generating the image data, and/or retrieving image 100 from memory (e.g., memory or storage 608 of FIG. 6, or storage 717 or database 705 of FIG. 7, or any other suitable data store, or any combination thereof) and/or receiving the image over any suitable data interface, or by accessing image 100 using any other suitable methodology, or any combination thereof. In some embodiments, the media application may be configured to access, and/or perform processing on, output or transmit, image 100 in response to receiving a user input or a user request, e.g., to access a website, webpage, or application associated with image 100, or to access an electronic message (e.g., a text message, email, notification, or any other suitable electronic message, or any combination thereof).

In some embodiments, image 100 may correspond to at least a portion of, or be included in, a media asset. In some embodiments, image 100 may be a digital image; a photo; a picture; a still image; a live photo; a video; a movie; a media asset; a recording; a slow motion video; a panorama photo; a GIF, a meme; or any other suitable image; or any suitable portion thereof, or any combination thereof. In some embodiments, image 100 may correspond to any suitable format, e.g., JPEG, GIF, PNG, or any other suitable format, or any combination thereof.

At 126, the media application may identify one or more objects in image 100. As referred to herein, the term "object" should be understood to refer to any person, character, avatar, structure, landmark, landscape, terrain, animal, item, thing, location, place, or any portion or component thereof, any suitable portion of the natural world or an environment, or any other suitable observable entity or attribute thereof visually depicted in an image or video. For example, if an image depicts a sky or skyline, the sky or skyline may correspond to an object, and/or portions thereof (e.g., one or more clouds) may correspond to an object.

In some embodiments, the media application may identify objects 102, 104, 106, 108, 110 (corresponding to a television, a keyboard, a chair, a plant, and headphones, respectively) using any suitable computer-implemented technique. For example, the media application may identify, localize, distinguish, and/or extract the different objects, and/or different types or classes of the objects, or portions thereof, of image 100. For example, such techniques may include determining which pixels in image 100 belong to a depiction of computer display 102; which pixels in image 100 belong to a depiction of keyboard 104; which pixels in image 100 belong to a depiction of chair 106; which pixels in image 100 belong to a depiction of plant 108; which pixels in image 100 belong to a depiction of headphones 110; and which pixels of image 100 belong to a background or physical environment surrounding the object. The media application may be configured to indicate such object classifications, and/or locations of the object within image 100, in metadata to be associated with image 100. Such metadata may describe each identified object and/or may be associated with supplemental content 122 related to the identified object. In some embodiments, when the media application accesses image 100, metadata may have been previously associated with image 100 indicating such object classifications and/or locations of the object within image 100.

In some embodiments, the media application may employ machine learning and/or heuristic techniques to identify objects, determine locations (e.g., coordinates within image 100) of objects, and/or track (e.g., if image 100 is part of a video) locations of the objects over time. In some embodiments, objects may be identified and localized using, for example: an image thresholding technique; an image segmentation technique; a computer vision technique; an image processing technique; object recognition; pattern recognition; an edge detection technique; a color pattern recognition technique; a partial linear filtering technique; regression algorithms; and/or neural network pattern recognition; or any other suitable technique; or any combination thereof. In some embodiments, the image processing system may utilize one or more machine learning models (e.g., naive Bayes algorithm, logistic regression, recurrent neural network, convolutional neural network (CNN), bi-directional long short-term memory recurrent neural network model (LSTM-RNN), or any other suitable model, or any combination thereof) to localize and/or classify objects in a given image or frame of the captured video.

In some embodiments, the media application may identify one or more objects in image 100, enable objects to be selectable, and identify supplemental content 122 (e.g., URLs, advertisements, option(s) to purchase a product(s) corresponding to or otherwise related to the object, and/or other suitable descriptions or information related to a one or more objects in image 100, or any suitable combination thereof) related to selectable objects in the image, using the techniques described in application Ser. No. 18/102,230, filed Jan. 27, 2023 in the name of Adeia Guides Inc., the contents of which are hereby incorporated by reference herein in their entirety. In some embodiments, metadata may comprise an identifier of the object, a playback position within a media stream or other video at which the object appears, coordinates at which the object is depicted in image 100, a URL or other pointer to additional information related to the object, or any other suitable data, or any suitable combination thereof.

In some embodiments, the media application may generate respective graphical indicators, e.g., bounding shapes, boxes or other bounding mechanisms surrounding a perimeter of and enclosing identified objects 102, 104, 106, 108, 110; only the four corners of a bounding box or any other suitable portion thereof; a highlighted shape to accentuate or emphasize a target location and/or zoomed-in location; color changes; or any other suitable indication; or any combination thereof. The bounding shape may be any suitable shape (e.g., a circle, a box, a square, a rectangle, a polygon, an ellipse, or any other suitable shape, or any combination thereof). The bounding shape may be calculated in any suitable manner, and may be fitted to particular objects and/or portions of an image using any suitable technique, and other portions of the image may be excluded from the bounding shape. In some embodiments, the depictions of objects 102, 104, 106, 108, and 100 may be surrounded by bounding boxes. Such bounding boxes may or may not be present in image 100 when image 100 is stored or transmitted.

At 128, the media application may cause one or more of objects 102, 104, 106, 108, 110 of image 100 to become selectable, to enable supplemental content 122 to be accessed. For example, the media application may associate one or more portions of metadata (associated with a particular object) with coordinates and/or pixels of a particular object (e.g., computer display 102) determined at 126, or a bounding box associated with such object, or pixels or coordinates within a certain vicinity of such object, or other icon proximate to the object, in image 100. For example, a hyperlink or other pointer may be embedded at the coordinates of object 102 such that when object 102 is selected by the user, the media application may cause one or more websites or applications associated with "OfficeMax" and/or "Lenovo" as indicated at 123 and 125, respectively, to be accessed (e.g., as an overlay or at another portion of the display of computing device 101 other than where image 100 is depicted, and/or instead of image 100 such as, for example, via a web browser, or using any other suitable display arrangement). For example, "OfficeMax" and/or "Lenovo" may be a manufacturer or vendor for computer display 102, or may be otherwise related to computer display 102. In some embodiments, halos or other indicators 112, 114, 116, and 118 may be selectable to access supplemental information related to objects 102, 104, 106, and 108, respectively. In some embodiments, each identified object in image 100 may be selectable to access supplemental information, or certain objects (e.g., deemed not to be of interest to the user) may not be selectable to access supplemental information. In some embodiments, at 130, to enable an object to become selectable, the media application may employ one or more of the following in relation to image 100: an HTML file as a base structure; a CSS file to define layers and placement of items or objects; a JSON file to store coordinates of objects in image 100; and/or a JavaScript file to store functions to define reactions to clicking objects.

In some embodiments, the media application may use a classification of a particular object and/or an identifier of a particular object to identify and/or retrieve relevant supplemental content 122, e.g., based on a web crawl, based on data stored at any suitable database, based on data from any suitable application, based on trending or popular data, based on locally stored data, based on a user profile of a user, or based on any other suitable data, or any combination thereof. In some embodiments, upon receiving selection of a particular object, the supplemental information may be directly accessed, and/or the user may be presented various options of supplemental information he or she can further select and access. In some embodiments, the information may be presented in the form of an email, SMS message, MMS message, notification, popup, overlay, or any other suitable method for displaying information, and/or may be provided at a second screen computing device. In some embodiments, the supplemental content 122 for a particular object may be updated each time a user selects the particular object, or such supplemental content 122 may be updated continuously or periodically, independent of a user selection of the particular object. In some embodiments, the supplemental content 122 may indicate to the user metadata for one or more objects, e.g., coordinates of one or more objects in image 100, a classification of one or more objects in image 100, a size or shape of one or more objects in image 100, an identifier of object(s) in image 100, or any other suitable data, or any combination thereof.

At 130, the media application may modify image 100 by applying a digital watermark 120 to image 100 to embed and/or encode metadata in image 100. For example, the media application may use any suitable algorithm or technique to provide and apply digital watermark 120 as a marker to embed metadata into a noise-tolerant signal such as, for example, visual (e.g., image or video) data, text data and/or audio data of image 100. In some embodiments, this may be understood as caching data (e.g., metadata and/or supplemental content) in image 100. In some embodiments, digital watermark 120 may be invisible or imperceptible to the user such that the watermark data is hidden in image 100 but nonetheless available for subsequent extraction and/or processing. Alternatively, the watermark may be visible, such that when image 100 is accessed or played back, the watermark data is displayed on screen, e.g., in an unobtrusive manner. While applying a digital watermark is discussed in the example of FIG. 1, in some embodiments, the media application may employ any suitable steganography technique or cryptography technique, or any other suitable computer-implemented technique, to embed and/or encode metadata in image 100, additionally or alternatively to applying a digital watermark.

Digital watermark 120 may be applied to an entirety of image 100, or any suitable portion(s) thereof, and each digital watermark may be associated with a particular object, or multiple objects, of image 100. For example, the media application may reference the locations (e.g., pixels or coordinates) of each object stored in the metadata, and may embed respective digital watermarks for each object at the location in image 100 corresponding to the depiction of the corresponding object. For example, a digital watermark associated with computer display 102 may be embedded at a portion of image 100 corresponding to or in the vicinity of computer display 102 in image 100; a digital watermark associated with keyboard 104 may be embedded at a portion of image 100 corresponding to or in the vicinity of keyboard 104 in image 100; a digital watermark associated with chair 106 may be embedded at a portion of image 100 corresponding to or in the vicinity of chair 106 in image 100; a digital watermark associated with plant 108 may be embedded at a portion of image 100 corresponding to or in the vicinity of plant 108 in image 100; and/or a digital watermark associated with headphones 110 may be embedded at a portion of image 100 corresponding to or in the vicinity of headphones 110 in image 100. In some embodiments, image 100 may be modified based on the processing at 124-130 at, e.g., a server, prior to being provided to computing device 101, or in response to a request from a user of computing device 101 to perform such processing.

At 132, the media application may obtain an image (e.g., modified image 103). For example, the media application may obtain modified image 103, e.g., via the Internet, via an electronic message, via storage, or via any other suitable mechanism, or any combination thereof. As another example, at 132, the media application may obtain modified image 103 by capturing an image 107 of the modified image 103 (as modified at 130) using a camera 138 (e.g., of computing device 105 that is distinct from computing device 101) or as a screen capture or screen shot 140 (e.g., at computing device 101, while the modified image 103 is being displayed at computing device 101). At 134, the media application (e.g., executing at least in part at computing device 101 or computing device 105) may be configured to process the captured image 107 by extracting, from the captured image 107, metadata embedded in at step 130. In some embodiments, obtaining captured image 107 of modified image 103 may include cropping image 107 or otherwise delineating a desired portion of image 107 (e.g., providing a tool to draw a box around) a portion of image 107, to obtain the captured image 107. In some embodiments, camera 138 of computing device 105 may capture image 107 based on capturing an image of computing device 101 while computing device 101 is displaying modified image 103 or is being displayed at any other suitable computing device and/or display, or camera 138 of computing device 105 may capture image 107 based on capturing a copy of image 100 printed on a physical medium.

In some embodiments, the media application may share or communicate or provide (e.g., provide instructions for executing) the digital watermarking technique or algorithm used at 130 (e.g., implemented at a server) with computing device 101 or computing device 105, to enable metadata to be extracted from modified image 103. For example, such extraction of metadata may enable the media application (e.g., executing at computing device 101 or 105) to obtain coordinates or other location indications of one or more objects in captured image 107, other parameters of the one or more objects (e.g., position, size and/or shape), a classification or identifier of the one or more objects, or any other suitable data, or any combination thereof. In some embodiments, the media application may provide a user of computing device 101 or 105 with a notification or indication regarding the extracted metadata of captured image 107 and/or regarding the supplemental content accessible by way of selecting one or more of the objects of captured image 107.

At 136, the media application may cause a portion of the captured image corresponding to the at least one object to be selectable to access the supplemental information related to the at least one object. For example, the media application may use metadata, extracted at 134, and having been embedded in modified image 103 using digital watermarking techniques, to restore the selectable object functionality described at 128, without a separate metadata file being provided to computing device 101 or 105 with captured image 107. The selection of an object (e.g., object 102) in captured image 107 to access supplemental content 122 may be received in any suitable form, e.g., the media application may detect a tap or a swipe or any suitable other gesture on a touchscreen display, a mouse click, a remote control input, biometric input, voice input, haptic input, or any other suitable input, or any combination thereof.

In some embodiments, a variety of different applications, entities, systems, or platforms may be configured to perform steps 124-136, or any suitable portion thereof. For example, a content provider (e.g., media content source 702) may be configured to generate image 100 and/or enable certain objects in image 100 to be selectable to access supplemental content, and/or may apply the digital watermark to image 100 to embed metadata in image 100 (or a separate entity may perform the digital watermarking) to generate modified image 103, at steps 124-130 of FIG. 1. As another example, a client side application (e.g., at computing device 105) may be configured to obtain modified image 103 (e.g., via the Internet or via an electronic message or via any other suitable mechanism) at 132, and/or may be configured to obtain captured image 107 (e.g., via a camera of computing device 105 and/or via an application native to the operating system of computing device 105 and/or via a third-party application installed at computing device 105, and/or via a screen shot captured at computing device 105), and perform the processing of steps 132-136. In some embodiments, the same or different client-side application (and/or a server-side application) may be configured to perform step 134 to extract, based on the digital watermark, the embedded metadata, and based on the extracted metadata, cause a portion of the image corresponding to the location of the at least one object in the image to be selectable to access supplemental information related to the at least one object. In some embodiments, the media application may be considered to comprise the ecosystem of such different applications, entities, systems, or platforms, or any suitable portion(s) thereof, e.g., the content provider and/or the client-side device configured to obtain modified image 103 and/or a captured image of modified image 103 and/or extract metadata from such image, for use to access supplemental information related to the at least one object.

Figure 2:
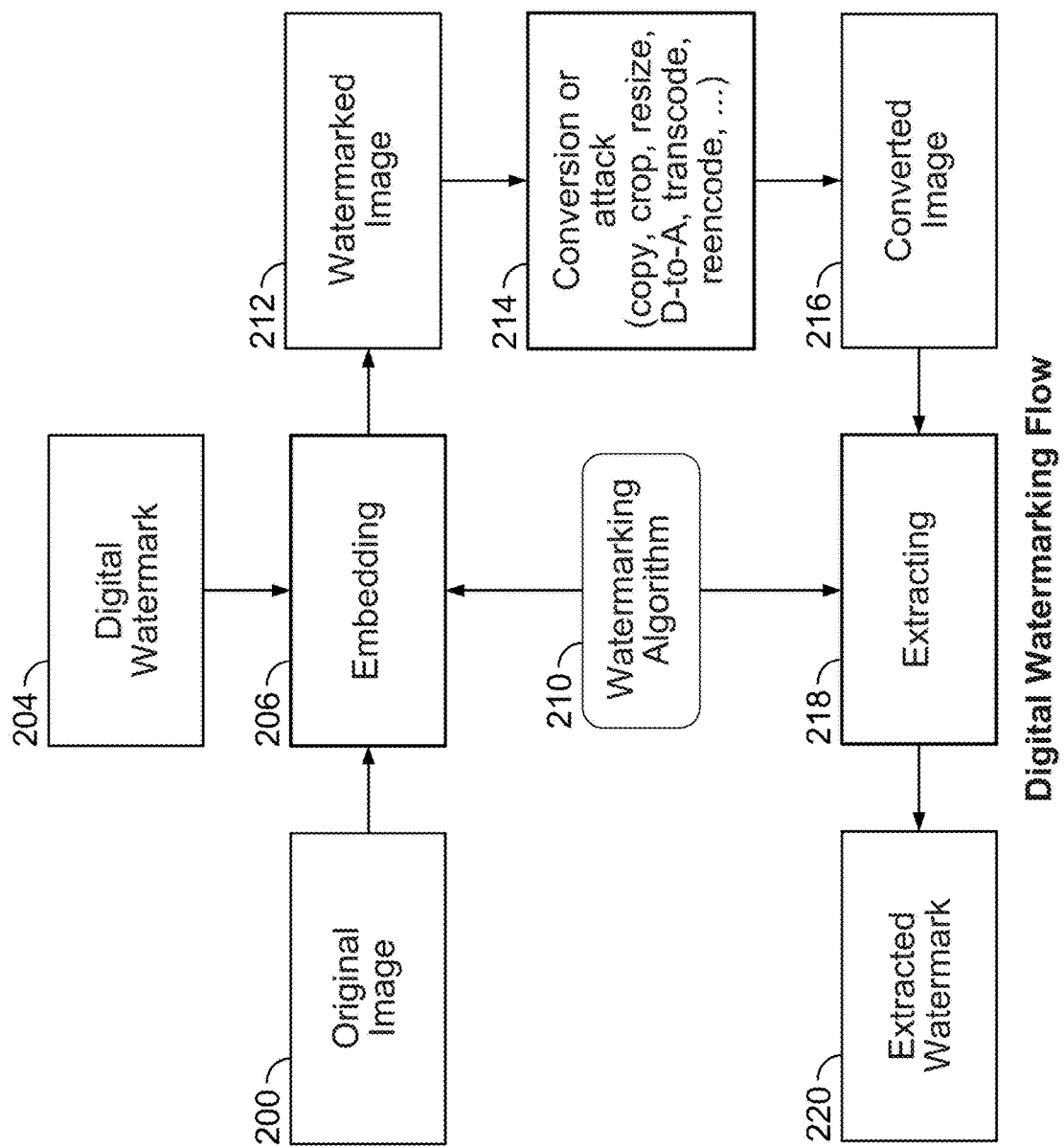
FIG. 2 shows a process for applying a digital watermark to image data, in accordance with some embodiments of this disclosure.

FIG. 2 shows a process for applying a digital watermark to image data, in accordance with some embodiments of this disclosure. As shown in FIG. 2, an embedding 206 of metadata (e.g., metadata embedded at 130 of FIG. 1) may be embedded in (or encoded in or populated in) original image 200 (e.g., image 100 of FIG. 1) using digital watermark 204. Any suitable watermarking technique or algorithm 210 may be employed to apply digital watermark 204. Based on the particular watermarking technique or algorithm that is employed, robustness to attacks, the amount or capacity of watermarked data it can carry, and the quality (e.g., imperceptibility) of watermarked image may vary. In some embodiments, the digital watermark may comprise data that identifies ownership of the copyright of original image 200 and/or may comprise data that can be used in forensic tracing on images and videos (e.g., identifying a source or consumer or a client device's information or account or profile information). Such digital watermark 204 may be used to embed metadata that is not visible to the viewer in the video or image data. In some embodiments, digital watermark 204 may be used in conjunction with checksum or error-correction code techniques, in embedding metadata in original image 200. In some embodiments, such as when original image 200 is included as part of a video, a watermark may be embedded across various frames or segments of the video. In some embodiments, different image frames to which watermarks have been applied may be combined, such as with unwatermarked image frames, to create a video content item.

In some embodiments, in applying digital watermark 204, the techniques described in Wadhera et al., "A Comprehensive Review on Digital Watermarking," WCNC-2201: Workshop on Computer Networks & Communications, May 1, 2021, Chennai, India may be used, the contents of which are hereby incorporated by reference herein in their entirety. In some embodiments, in applying digital watermark 204, the techniques described in Abraham et al., "An Imperceptible Spatial Domain Color Image Watermarking Scheme," Journal of King Saud University-Computer and Information Sciences 31 (2019) 125-133, may be used, the contents of which are hereby incorporated by reference herein in their entirety.

In some embodiments, digital watermark 204 may be applied to (e.g., superimposed on) a particular block of pixels of image 200, or to image 200 as a whole, in the spatial domain or the frequency domain. In some embodiments, respective watermarks embedding metadata and/or supplemental information associated with a particular object of the plurality of objects in image 200 may be applied at locations within image 200 corresponding to locations of the particular respective object. In some embodiments, superimposing digital watermark 204 on the digital pixel block may comprise adding or subtracting watermark pixel values to or from the digital pixel values of image 200. In some embodiments, the same or different watermarking techniques or algorithms 210 may be applied at various portions of image 200. In some embodiments, a watermark for a particular object may be applied at multiple portions of image 200, in case one or more of such portions are cropped out when a captured image is acquired (e.g., at 132 of FIG. 1), so that such information can still be extracted (e.g., at 134 of FIG. 1). In some embodiments, digital watermark 204 may be stored for later comparison with watermarks identified in subsequently analyzed images.

In some embodiments, an image or pixel block may be transformed into the frequency domain by the application of a transform, such as the discrete cosine transform, and the frequency domain may allow very detailed (high-frequency) information in the pixel block to be separated from very gradual or undetailed (low-frequency) information. For example, in the frequency domain, the watermark may be applied as adjustments to the low frequency areas, which may be less likely to be altered by subsequent alteration or encoding of the pixel block. In some embodiments, in the spatial domain a pixel may be associated with coefficients for different base colors (e.g., red, blue, and green color components), and to maintain color neutrality, the addition or subtraction of the watermark may be performed for each of the color coefficients, to embed hidden information in digital image 200.

In some embodiments, digital watermark 204 may introduce various types of variation to encode information. For instance, a watermark image may introduce sinusoidal variance in image properties that may include, but are not limited to hue, saturation, brightness, color value, luminance, or contrast. The sinusoidal variance may be applied via a gradient that changes intensity with the wave pattern. In some embodiments, digital watermark 204 may introduce various types of visual, audio and/or text patterns to encode information, e.g., where different patterns can correspond to different bit strings "10," "11," "00," and "01," and data included in digital watermark 204 may comprise a series of such bit strings (e.g., as shown at 120 of FIG. 1). In some embodiments, digital watermark 204 may be encoded in various image properties, e.g., waves having different amplitudes and/or frequencies may represent different bit values. In some embodiments, the shapes or patterns used to encode information in a watermark may be strategically determined based on factors that may include, but are not limited to: the visibility of different patterns to the human eye, the detectability and/or removability of different patterns by computer algorithms, and the type of image (e.g., the frequency) to which the watermark is being applied.

As shown in FIG. 2, watermarked image 212 (e.g., corresponding to modified image 103 of FIG. 1) may be obtained based on digital watermark 204 applied by way of watermarking algorithm 210. At 214, watermarked image 212 may be converted (e.g., captured via camera 138 of computing device 105 or via screen capture at computing device 101) to converted image 216 (e.g., captured image 107). In some embodiments, the conversion of watermarked image 212 at 214 may comprise one or more of copying, cropping, resizing, digital to analog conversion, transcoding, or reencoding of watermarked image 212. At 218, the media application may extract digital watermark 204 (e.g., as described at 134 of FIG. 2) and use the extracted watermark 220 to obtain the metadata (e.g., metadata) having been embedded at 206. Such metadata may indicate locations of various objects (e.g., objects 102, 104, 106, 108, and 110 of image 100 of FIG. 1) in the captured or otherwise obtained image, and may enable the captured image to maintain selectable object functionality even after it is screen captured, stored, shared, or even printed, to allow users to access supplemental content related to a particular selected object. For example, when the captured image 107 of FIG. 1 is displayed at computing device 101 or 105 supporting selectable object interaction, items or objects may be selectable, with the metadata information carried as extracted watermark 220.

Figure 3:
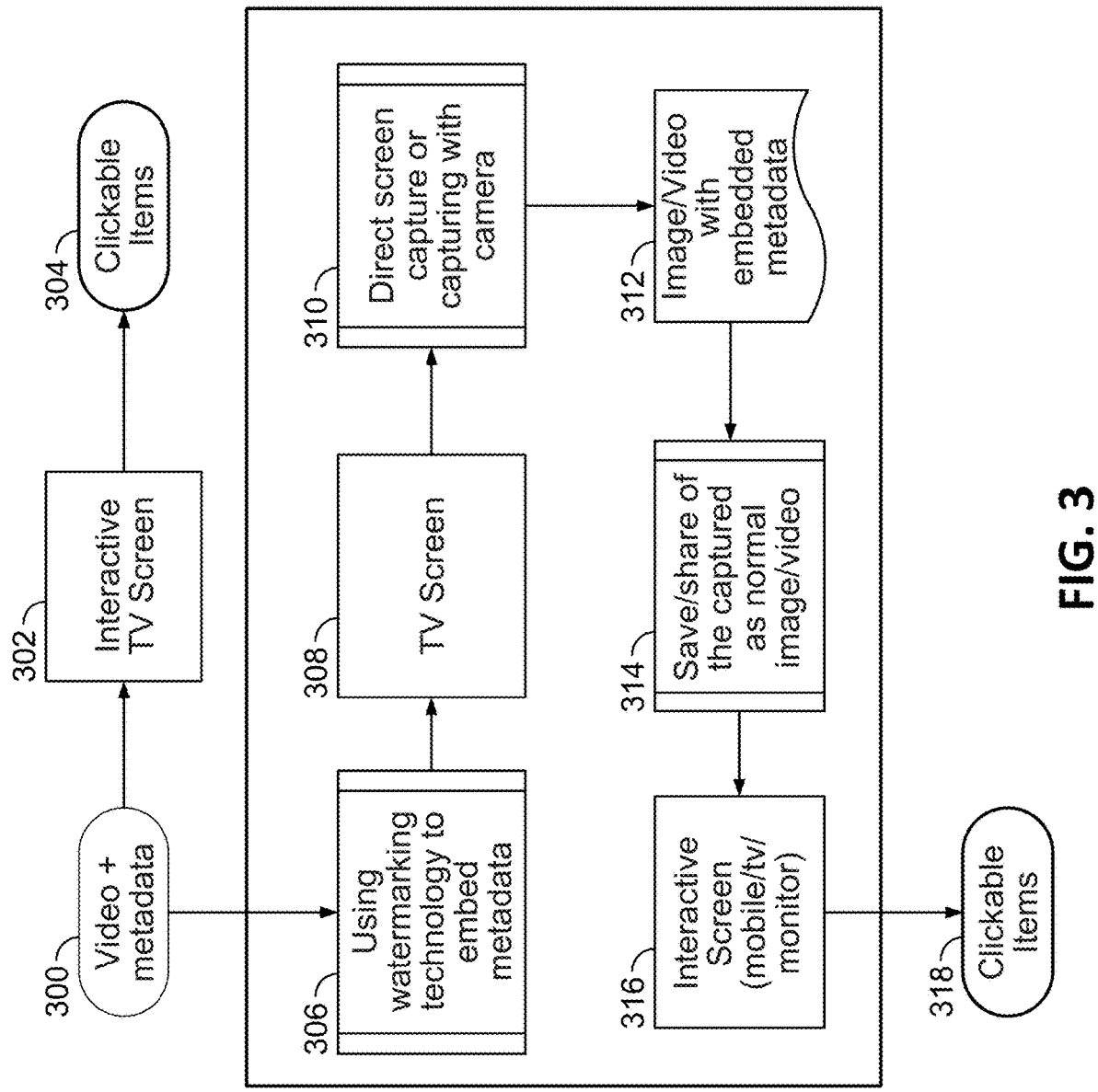
FIG. 3 shows an illustrative process for extending selectable object capability to a captured image, in accordance with some embodiments of this disclosure.

FIG. 3 shows an illustrative process for extending selectable object capability to a captured image, in accordance with some embodiments of this disclosure. At 300, metadata may be associated with an image or video (e.g., image 100 of FIG. 1), and as shown at 304, such image or video may be presented at a computing device (e.g., interactive TV screen 302) and may comprise clickable or otherwise selectable objects or items, where such metadata may indicate locations of objects in the image or video and/or selectable URLs or other selectable supplemental information related to particular objects in the image.

At 306, the media application may use watermarking technology to embed metadata in a modified version of the video or image indicated at 300. For example, such image or video may carry links to additional information as a watermark, which can be activated by client device applications to extract the watermark. Such image or video can be displayed on any device (at 308), or it can be printed on a traditional roadside billboard, paper, or a poster, or otherwise printed to exist in physical form in any other suitable manner. At 310, the media application may perform a direct screen capture (e.g., 140 at computing device 101 of FIG. 1), or a capture with a camera (e.g., camera 138 of computing device 105 of FIG. 1), to obtain the image modified with the digital watermark at 312 to embed the metadata.

In some embodiments, the embedded metadata may comprise coordinates of one or more objects identified in the image or video identified at 300. As a non-limiting example, the coordinates may be two integers of 8 or fewer bits in length, e.g., with 4 bits for the x coordinate and 4 bits for the y coordinate, to have a 1/16 accuracy in each dimension when representing where the object is. In some embodiments, an additional 8 bits could be used for object size and shape (e.g., a circle, a rectangle, or any other suitable shape), e.g., 4 bits for object size and 4 bits for object shape, for a size accuracy of 1/16 of the length of each dimension and which may represent 16 different shapes. In some embodiments, a short URL (e.g., 5 bytes long) may be embedded using the digital watermark. In such example, 7 bytes of information can be used to describe the size, location, shape of the object and its corresponding link. In some embodiments, multiple such clickable or selectable objects may be present in each frame.

In some embodiments, such coordinate information of objects indicated in the metadata may be accurate when at 310 a screen shot is captured of the full image or video frame, but may not be entirely accurate, for example, if a camera is used and captures only a portion of the full image or frame being displayed at another computing device or display device. At 310, if the media application determines that a camera was used to capture a captured image having been modified with the digital watermark (e.g., modified image 103 of FIG. 1), the media application may analyze the captured image using any suitable computer-implemented technique(s), as discussed in more detailed in relation to FIG. 4.

Figure 4:
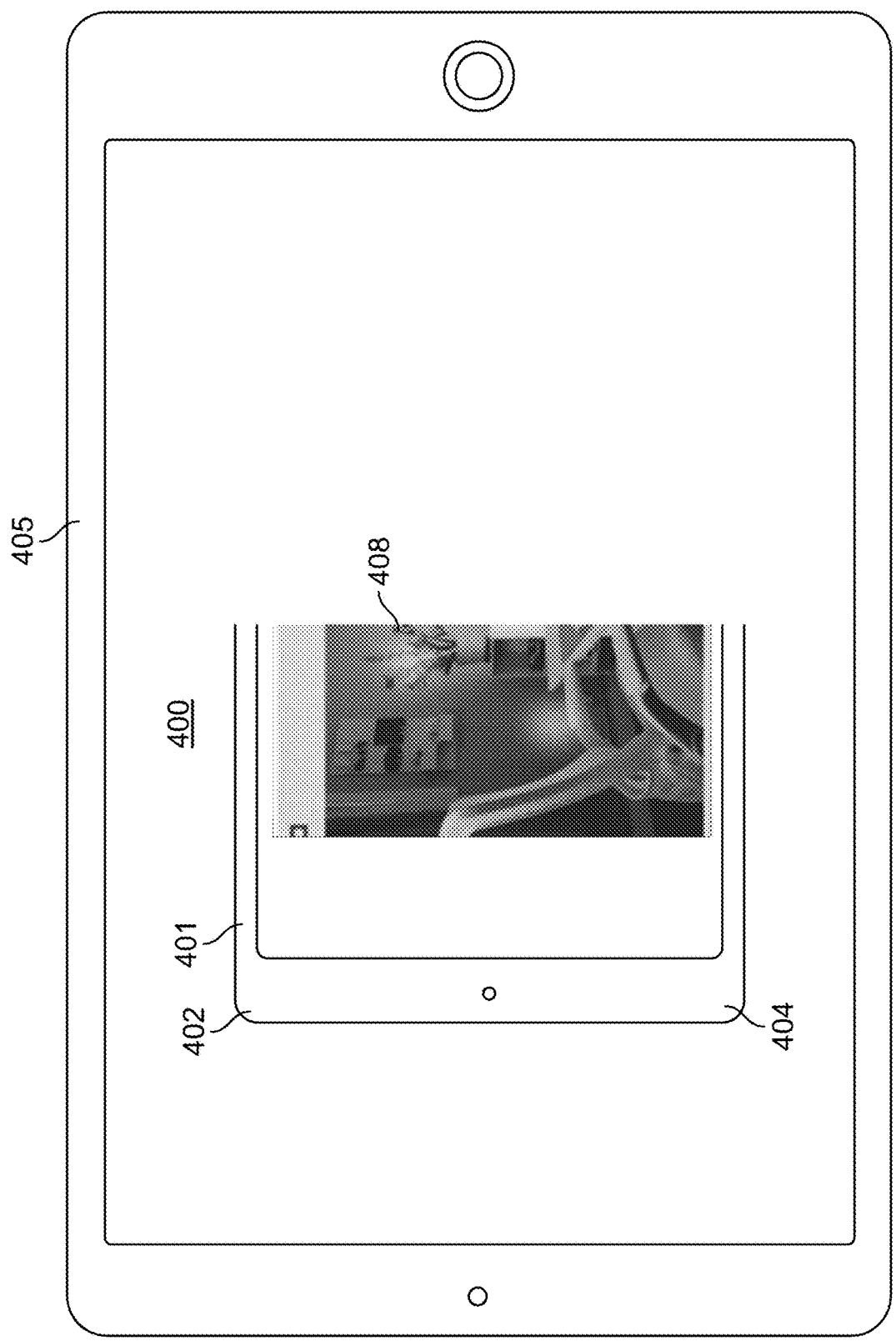
FIG. 4 shows a captured image, captured by a computing device, of an image being displayed on another computing device, in accordance with some embodiments of this disclosure.

FIG. 4 shows a captured image, captured by a computing device, of an image being displayed on another computing device, in accordance with some embodiments of this disclosure. For example, at 310, the media application may perform image processing (e.g., edge detection, object recognition, computer vision techniques) on image 400 of FIG. 4, which may be a zoomed-in or cropped portion of image 103 captured by camera 138 of computing device 105 (which may correspond to computing device 405 of FIG. 4), to identify which region of image 400 depicts the display of computing device 401 (which may correspond to computing device 101 of FIG. 1). The media application may identify corners 402 and 404 (and/or boundaries) of computing device 401 in image 400, and may determine that the perimeter of image 400 depicts the display of computing device 401. In some embodiments, based on the corners 402 and 404 and/or boundaries of the display of computing device 401 identified in image 400 captured by computing device 405, the media application may project such captured image 400 to an image depicting a larger and/or normal view of the display (e.g., a full-screen rectangular image, as shown at computing device 105 of FIG. 1). In some embodiments, based on boundaries of the display of computing device 401 identified in image 400, the media application may transform image 400 back to a rectangle (e.g., the shape of the overall computing device 401 partially depicted in image 400), to enable metadata to be better extracted, and determine a location of at least on object based on the extracted metadata, identified boundaries, and/or projected image.

For example, the media application may estimate the total size of computing device 401, and image 400, to be depicted in the projected image, based on analyzing a size and/or shape of the cropped or zoomed image 400 and the portions of image 400 corresponding to the depiction of computing device 401, and may extrapolate the boundaries of such image to generate an estimated full view of the image. In some embodiments, a type of computing device 401 may be identified based on image 400 (e.g., a certain model of a tablet), and real-world dimensions of such type of computing device may be known and correlated to the pixel representation of image 400, to determine the likely boundaries of such computing device in a full-screen view (e.g., un-zoomed-in or uncropped view) of image 400. In some embodiments, an image corresponding to a full-screen view of image 400 may be identified based on a web search or in a database, and may be used to project captured image 400 and estimate pixel locations.

The media application may extract the information embedded using the digital watermark (e.g., the coordinates of one or more depicted objects, such as, for example, plant 408, in the original modified image 103) and use such information, together with the projected captured image, to determine the location of plant 408 in image 400, and to provide the selected object functionality intended for plant 408 at such determined location. In a non-limiting example, the coordinates may be a pair of 4 bit integers, defining the object location on a 16×16 grid of the screen. Such object location may then be projected back to estimate parameters of a screen shot of a full view of the partial view shown in image 400, to facilitate clickable or selectable object or item functionality at 318 via a screen 316 of computing device 405 (e.g., for the saved or shared video or image indicated at 314). In some embodiments, projection of the image may not be performed, and object location may instead be directly obtained on the 16×16 grid of the affine transformed screen or display boundary.

In some embodiments, if image 400 is determined by the media application to depict three corners of the display of computing device 401, the media application can infer the location of the missing corner based on analyzing the captured dimensions of computing device 401 depicted in the image and estimating where such fourth corner should be depicted. In some embodiments, if image 400 is determined by the media application to depict two corners of the display of computing device 401, the media application may use an assumption of the aspect ratio of the screen (e.g., 16:9) and can infer the other two missing corners based on this assumption. In some embodiments, the media application may cause such information to be watermarked over multiple frames for redundancy, and in a non-limiting example, can deliver information at a rate of a few hundred bytes per second, sufficient to deliver the aforementioned selectable objects in a video or other imagery.

In some embodiments, if image 400 is determined by the media application to depict only one corner (or otherwise only a relatively small portion) of the display of computing device 401, the media application can extract information about one or more of multiple selectable objects depicted in image 400 based on such information having been watermarked at different locations in image 400 respectively corresponding to a location of the appropriate object in image 400. For example, since the metadata may comprise the location of the relevant object, the media application can predefine a region of the image that contains the object and watermark the corresponding metadata information associated with this object within that region. Thus, different metadata can be embedded at different locations, each being enclosed in a region of the image where the corresponding object is depicted, and if the user is only interested in one of the objects in the image (e.g., modified image 103 of FIG. 1), he or she can capture only that portion of the screen, and the information about the captured object may be obtained and made available when requested or at any other suitable time.

In some embodiments, where only a portion of a larger image or frame is captured (e.g., as shown in FIG. 4), the media application may not have information about details such as a size of the larger image or frame or other objects that might be present in such larger image or frame. In such a circumstance, instead of (or in addition to) using embedded location information related to an object, the media application may extract information about an object (e.g., an identity or a type of the object) that is present in the captured portion using embedded data (e.g., a link or URL or other supplemental information embedded via the digital watermarking techniques described herein), and use computer vision techniques (or any other suitable image processing technique or other suitable technique described herein) to locate such object (that matches the identity or type of object determined in the supplemental content) in the captured portion. For example, if there is only one corner or even no corner of the screen is captured, the media application may still be capable of identifying the location and bounding box of an object of interest.

Figure 5:
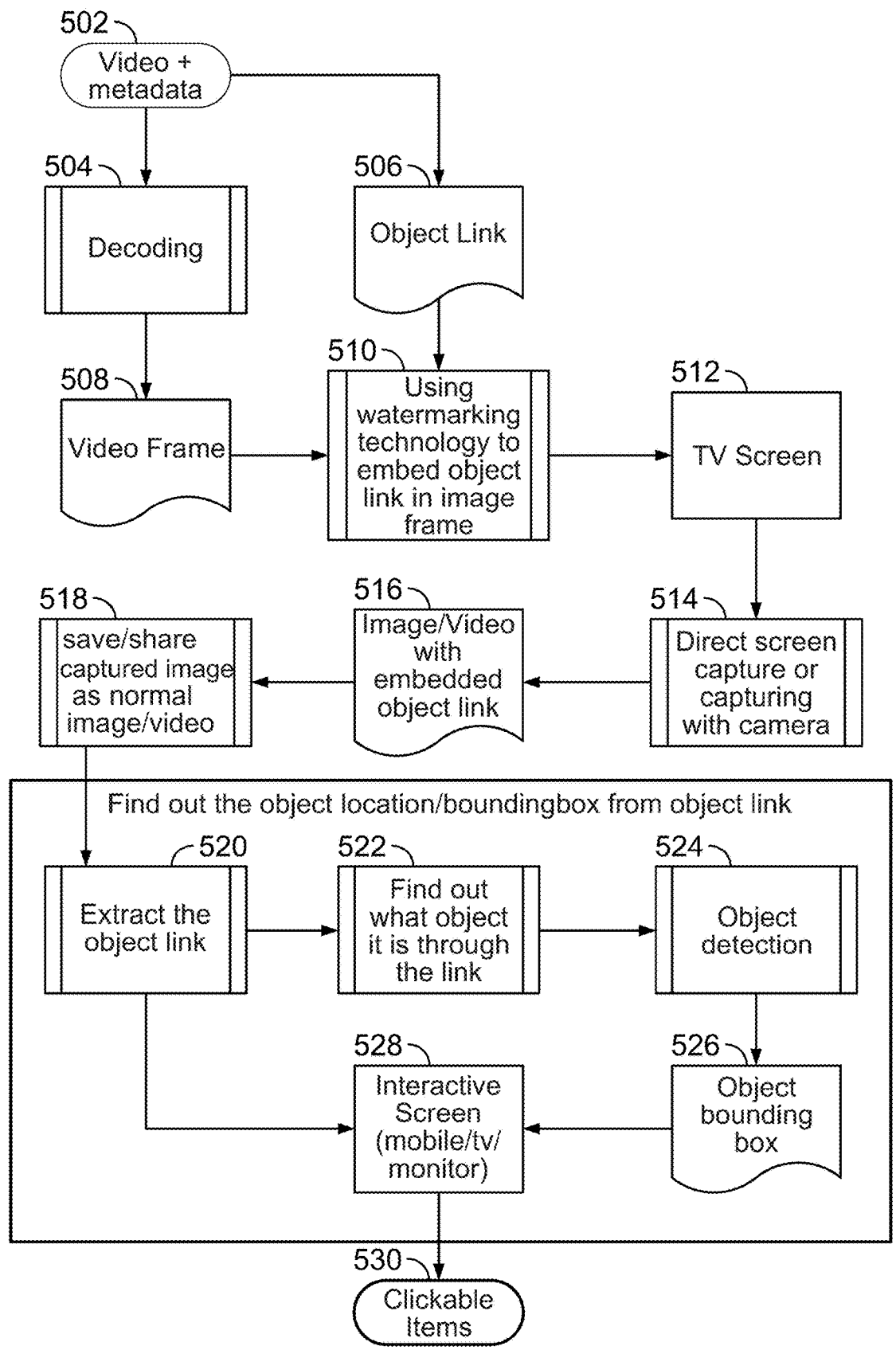
FIG. 5 shows an illustrative process for extending selectable object capability into a captured image, in accordance with some embodiments of this disclosure.

FIG. 5 shows an illustrative process for extending selectable object capability into a captured image, in accordance with some embodiments of this disclosure. In some embodiments, watermarking information can be embedded in image or video 502 before such image or video is provided to a client device for display; in such a circumstance, the watermark may be subjected to encoding and/or decoding steps that the image or video undergoes during transmission and/or storage of such content (which may lead to information loss). Alternatively, in some embodiments, the image or video having the selectable objects can be delivered to the client device without the watermarked information being embedded, and the media application executing at the client device (e.g., computing device 105 of FIG. 1) can separately receive and cause such information to be embedded into each frame on the display before the image or video frame is rendered. Such aspects may enable data to be embedded robustly without having to subject the watermarked data to the encoding or decoding process.

As referred to herein, compression and/or encoding of an image may be understood as performance (e.g., by the media application, using any suitable combination of hardware and/or software) of bit reduction techniques on digital bits of the image in order to reduce the amount of storage space required to store the at least a portion of a media asset. Such techniques may reduce the bandwidth or network resources required to transmit the image over a network or other suitable wireless or wired communication medium and/or enable bitrate savings with respect to downloading or uploading the image data. Such techniques may encode the at least a portion of the image such that the encoded image or encoded portion thereof may be represented with fewer digital bits than the original representation while minimizing the impact of the encoding or compression on the quality of the image data.

At 504, the media application (e.g., executing at a client device) may decode the encoded video or image and/or metadata indicated at 502, to obtain a reconstruction of such video or image and/or metadata associated therewith, at 508. At 510, the media application may use the digital watermarking techniques described herein to embed an object link (e.g., a URL) associated with a particular object in an image or frame depicting such object, and such content may be displayed at computing device (e.g., a television screen) at 512. At 514, a direct screen capture of such displayed content may be performed, or a camera may be used to capture an image of such displayed content, and at 516, 518, and 520, such image or video with the embedded object link may be obtained, stored and/or shared, and the embedded object link may be extracted.

At 522-526, the media application may utilize such extracted object link to determine a classification or identity of the particular object, and the media application may utilize image processing techniques (e.g., computer vision) to determine the location of the particular object in the image that corresponds to such classification or identity, and identify a bounding box for such object. In a non-limiting example, such object link may consume only 5 bytes information for each object having the embedded object link. Such technique may save the bits otherwise used for location, size, and/or shape of the object. At 528 and 530, the selectable object functionality for the displayed image may be utilized to access supplemental information related to one or more objects in the displayed image.

In some embodiments, watermarked information may be embedded in audio data of certain content, e.g., a podcast. For example, the media application may access a transcript of the podcast, and may access links created to relevant products or services based on the watermark information in the audio data. In some embodiments, watermarked information may be embedded in closed captioning and/or subtitles of video content.

In some embodiments, an image having the embedded information may be modified, e.g., scaled-down in resolution, and the original resolution may be communicated to the media application. The media application may be configured to adjust the locations based on such original resolution, e.g., if the locations of the objects in the scaled-down resolution version of the image do not correspond to the original locations, to enable relevant supplemental content for a particular object at a particular location to be accessed.

In some embodiments, an image, e.g., image 100 of FIG. 1, may be captured from a social media application or website (e.g., a restaurant reviews website), or may be, for example, a physical copy of a menu at a restaurant. The media application may determine whether there is a discrepancy between such image and related information in the supplemental information related to such image or objects therein. For example, the media application may determine that a copy of a restaurant menu on the restaurant's website indicates that certain food or beverage items are for sale at certain prices, and may depict different text or graphics on the menu, where such content may be accessible by way of a URL in supplemental content related to the potentially outdated physical copy of the menu or outdated digital copy of the menu at the restaurant review website. The media application may determine that the copy of the menu (e.g., on the restaurant reviews website or the physical copy of the menu in the restaurant) indicates different food or beverage items and/or different prices and/or different texts or graphics. In such instance, the media application may cause one or more portions of the menu on the restaurant reviews website to be updated (e.g., replaced) to conform to the menu on the restaurant's website, or to otherwise comprise a notification that the menu has potentially changed along with a link to the updated menu.

In some embodiments, object location and size information can be retrieved by exploring the embedded link for the object information, and using the object detection technique to find out the bounding box of the object in the image and/or video. In some embodiments, the metadata can be embedded in the audio information of the captured video.

In some embodiments, videos and images (or posters on a wall) can carry information as watermarks to augment an experience for AR glasses, and amount of data to be watermarked can depend on the implementation. In some embodiments, videos with parental rating information can embed the information as a watermark, which may enable blocking any attempts to circumvent a parental rating limit by recording a video, e.g., with a smartphone. In some embodiments, very little information (less than five characters) may be utilized to incorporate this information into a watermark.

In some embodiments, information can be embedded on paper, e.g., raffle tickets or trading cards, and the media application (e.g., executing on a client device) may reveal the winning ticket, or some special power or feature on a trading card. In some embodiments, when a computing device (e.g., computing device 105 of FIG. 1) captures an image or video frame being displayed on another screen (e.g., a display of computing device 101 of FIG. 1), selectable information can be extracted and saved as metadata explicitly before the image or video is compressed and stored on computing device 105.

Figure 6:
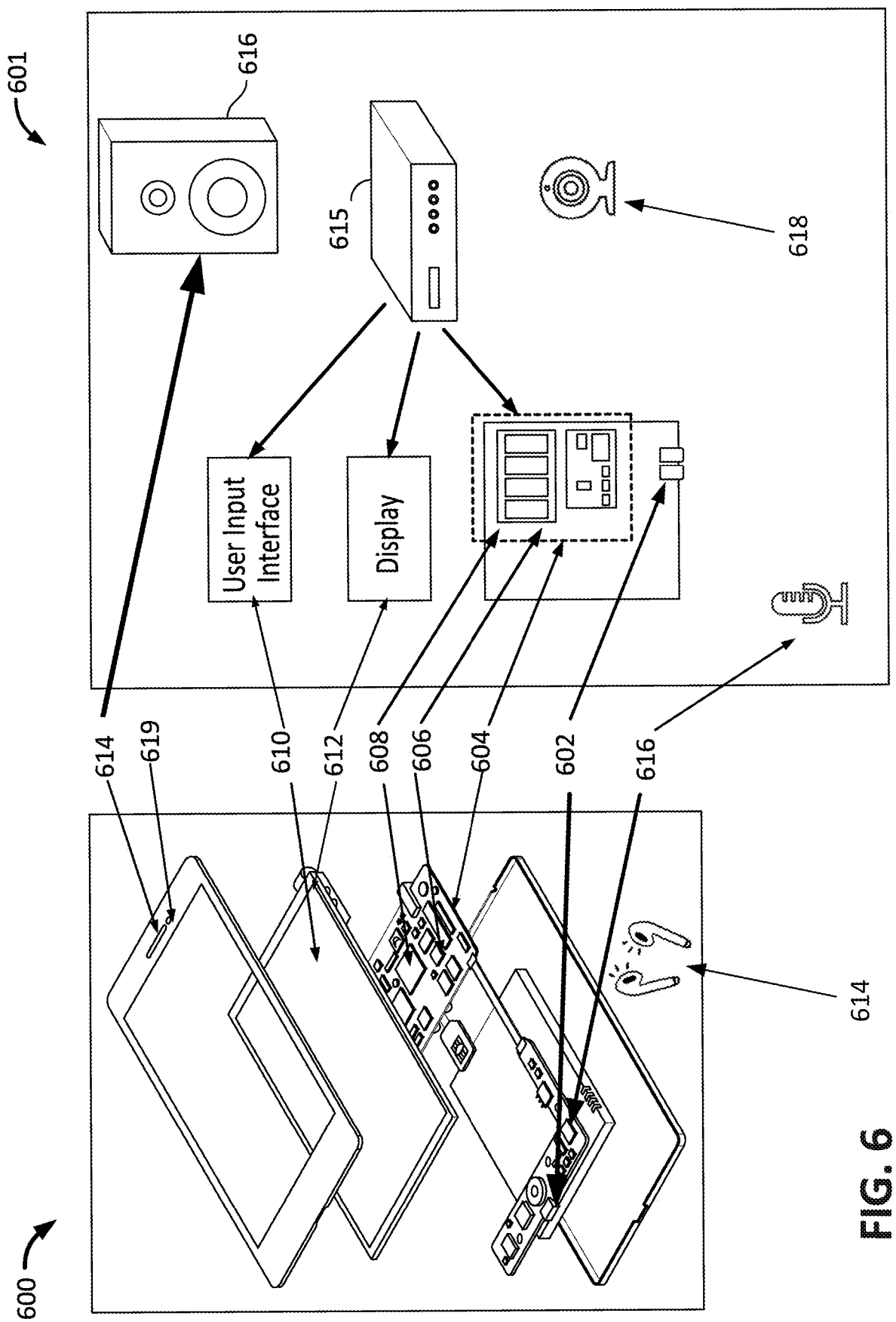
FIGS. 6-7 describe illustrative computing devices, systems, servers, and related hardware for extending selectable object capability to a captured image, in accordance with some embodiments of the present disclosure.
Figure 7:
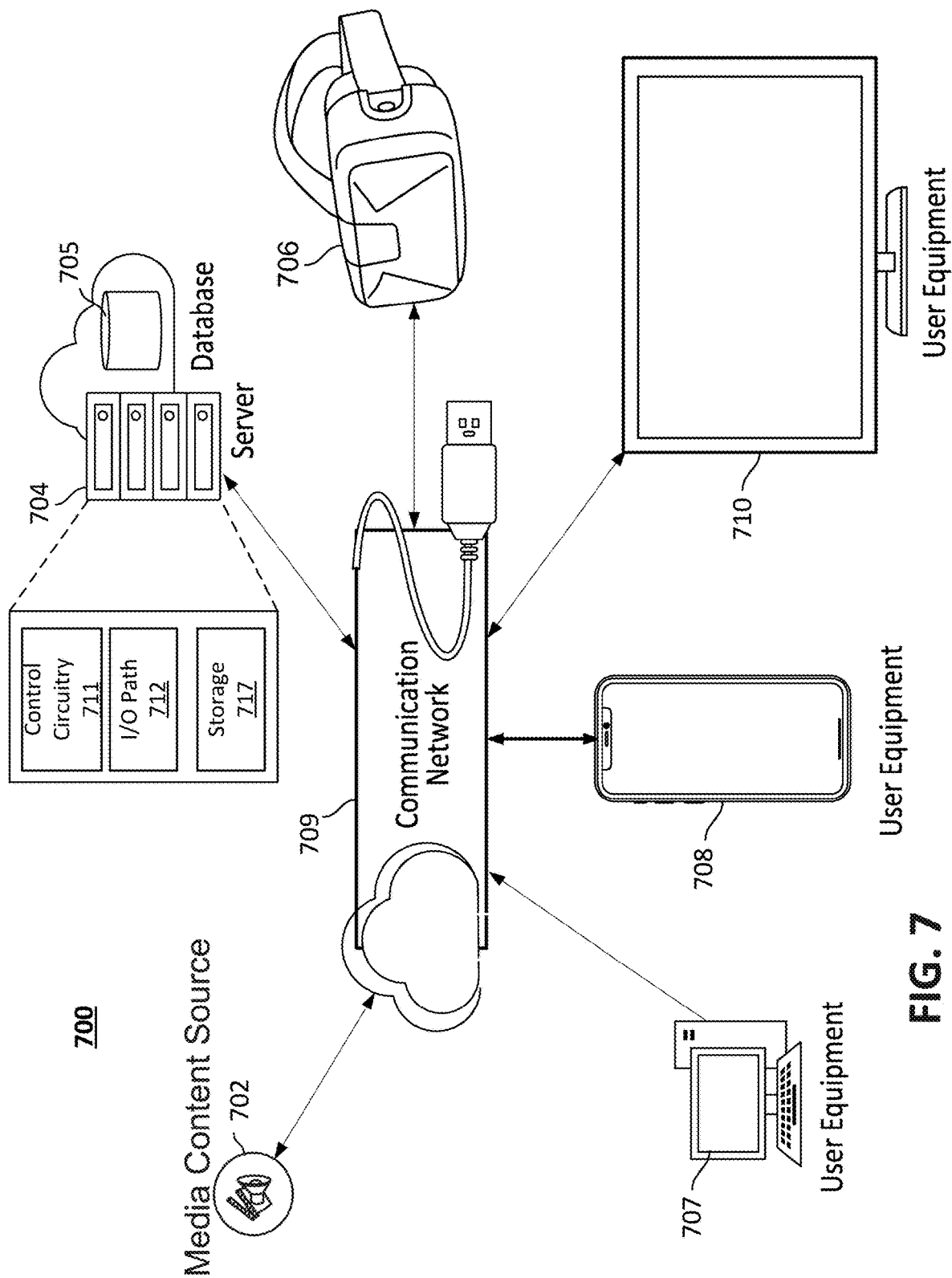

FIGS. 6-7 describe illustrative devices, systems, servers, and related hardware for extending selectable object capability to a captured image, in accordance with some embodiments of the present disclosure. FIG. 6 shows generalized embodiments of illustrative computing devices 600 and 601, which may correspond to, e.g., computing device 101 and 105 of FIG. 1; computing device 405 of FIG. 4. For example, computing device 600 may be a smartphone device, a tablet, a near-eye display device, an XR device, or any other suitable device capable of processing images and extracting watermarked data, e.g., locally or over a communication network. In another example, computing device 601 may be a user television equipment system or device. Computing device 601 may include set-top box 616. Set-top box 616 may be communicatively connected to microphone 617, audio output equipment (e.g., speaker or headphones 614), and display 612. In some embodiments, microphone 617 may receive audio corresponding to a voice of a video conference participant and/or ambient audio data during a video conference. In some embodiments, display 612 may be a television display or a computer display or a digital billboard or any other suitable display or any combination thereof. In some embodiments, set-top box 616 may be communicatively connected to user input interface 610. In some embodiments, user input interface 610 may be a remote-control device. Set-top box 616 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of computing devices are discussed below in connection with FIG. 7. In some embodiments, device 600 may comprise any suitable number of sensors (e.g., gyroscope or gyrometer, or accelerometer, etc.), and/or a GPS module (e.g., in communication with one or more servers and/or cell towers and/or satellites) to ascertain a location of device 600. In some embodiments, device 600 comprises a rechargeable battery that is configured to provide power to the components of the device.

Each one of computing device 600 and computing device 601 may receive content and data via input/output (I/O) path 602. I/O path 602 may provide content (e.g., broadcast programming, on-demand programming, internet content, content available over a local area network (LAN) or wide area network (WAN), and/or other content) and data to control circuitry 604, which may comprise processing circuitry 607 and storage 608. Control circuitry 604 may be used to send and receive commands, requests, and other suitable data using I/O path 602, which may comprise I/O circuitry. I/O path 602 may connect control circuitry 604 (and specifically processing circuitry 607) to one or more communications paths (described below). I/O functions may be provided by one or more of these communications paths, but are shown as a single path in FIG. 6 to avoid overcomplicating the drawing. While set-top box 616 is shown in FIG. 6 for illustration, any suitable computing device having processing circuitry, control circuitry, and storage may be used in accordance with the present disclosure. For example, set-top box 616 may be replaced by, or complemented by, a personal computer (e.g., a notebook, a laptop, a desktop), a smartphone (e.g., device 600), an XR device, a tablet, a network-based server hosting a user-accessible client device, a non-user-owned device, any other suitable device, or any combination thereof.

Control circuitry 604 may be based on any suitable control circuitry such as processing circuitry 607. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 604 executes instructions for the media application stored in memory (e.g., storage 608). Specifically, control circuitry 604 may be instructed by the media application to perform the functions discussed above and below. In some implementations, processing or actions performed by control circuitry 604 may be based on instructions received from the media application.

In client/server-based embodiments, control circuitry 604 may include communications circuitry suitable for communicating with a server or other networks or servers. The media application may be a stand-alone application implemented on a device or a server. The media application may be implemented as software or a set of executable instructions. The instructions for performing any of the embodiments discussed herein of the media application may be encoded on non-transitory computer-readable media (e.g., a hard drive, random-access memory on a DRAM integrated circuit, read-only memory on a BLU-RAY disk, etc.). For example, in FIG. 6, the instructions may be stored in storage 608, and executed by control circuitry 604 of a device 600.

In some embodiments, the media application may be a client/server application where only the client application resides on device 600, and a server application resides on an external server (e.g., server 704 and/or media content source 702). For example, the media application may be implemented partially as a client application on control circuitry 604 of device 600 and partially on server 704 as a server application running on control circuitry 711. Server 704 may be a part of a local area network with one or more of devices 600, 601 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 704 and/or an edge computing device), referred to as "the cloud." Device 600 may be a cloud client that relies on the cloud computing capabilities from server 704 to generate and/or extract watermarked data. The client application may instruct control circuitry 604 to generate personalized engagement options in a VR environment.

Control circuitry 604 may include communications circuitry suitable for communicating with a server, edge computing systems and devices, a table or database server, or other networks or servers. The instructions for carrying out the above mentioned functionality may be stored on a server (which is described in more detail in connection with FIG. 7). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the internet or any other suitable communication networks or paths (which is described in more detail in connection with FIG. 7). In addition, communications circuitry may include circuitry that enables peer-to-peer communication of user equipment, or communication of computing device in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media application data described above. Nonvolatile memory may also be used (e.g., to launch a boot-up routine and other instructions). Cloud-based storage, described in relation to FIG. 6, may be used to supplement storage 608 or instead of storage 608.

Control circuitry 604 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 604 may also include scaler circuitry for upconverting and downconverting content into the preferred output format of computing device 600. Control circuitry 604 may also include digital-to-analog converter circuitry and analog-to-digital converter circuitry for converting between digital and analog signals. The tuning and encoding circuitry may be used by computing device 600, 601 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from computing device 600, the tuning and encoding circuitry (including multiple tuners) may be associated with storage 608.

Control circuitry 604 may receive instruction from a user by way of user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of each one of computing device 600 and computing device 601. For example, display 612 may be a touchscreen or touch-sensitive display. In such circumstances, user input interface 610 may be integrated with or combined with display 612. In some embodiments, user input interface 610 includes a remote-control device having one or more microphones, buttons, keypads, any other components configured to receive user input or combinations thereof. For example, user input interface 610 may include a handheld remote-control device having an alphanumeric keypad and option buttons. In a further example, user input interface 610 may include a handheld remote-control device having a microphone and control circuitry configured to receive and identify voice commands and transmit information to set-top box 616.

Audio output equipment 614 may be integrated with or combined with display 612. Display 612 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 612. Audio output equipment 614 may be provided as integrated with other elements of each one of device 600 and device 601 or may be stand-alone units. An audio component of videos and other content displayed on display 612 may be played through speakers (or headphones) of audio output equipment 614. In some embodiments, audio may be distributed to a receiver (not shown), which processes and outputs the audio via speakers of audio output equipment 614. In some embodiments, for example, control circuitry 604 is configured to provide audio cues to a user, or other audio feedback to a user, using speakers of audio output equipment 614. There may be a separate microphone 617 or audio output equipment 614 may include a microphone configured to receive audio input such as voice commands or speech. For example, a user may speak letters or words that are received by the microphone and converted to text by control circuitry 604. In a further example, a user may voice commands that are received by a microphone and recognized by control circuitry 604. Camera 618 may be any suitable video camera integrated with the equipment or externally connected. Camera 618 may be a digital camera comprising a charge-coupled device (CCD) and/or a complementary metal-oxide semiconductor (CMOS) image sensor. Camera 618 may be an analog camera that converts to digital images via a video card.

The media application may be implemented using any suitable architecture. For example, it may be a stand-alone application wholly implemented on each one of computing device 600 and computing device 601. In such an approach, instructions of the application may be stored locally (e.g., in storage 608), and data for use by the application is downloaded on a periodic basis (e.g., from an out-of-band feed, from an internet resource, or using another suitable approach). Control circuitry 604 may retrieve instructions of the application from storage 608 and process the instructions to provide video conferencing functionality and generate any of the displays discussed herein. Based on the processed instructions, control circuitry 604 may determine what action to perform when input is received from user input interface 610. For example, movement of a cursor on a display up/down may be indicated by the processed instructions when user input interface 610 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 604 may allow a user to provide user profile information or may automatically compile user profile information. For example, control circuitry 604 may access and monitor network data, video data, audio data, processing data, participation data from a conference participant profile. Control circuitry 604 may obtain all or part of other user profiles that are related to a particular user (e.g., via social media networks), and/or obtain information about the user from other sources that control circuitry 604 may access. As a result, a user can be provided with a unified experience across the user's different devices.

In some embodiments, the media application is a client/server-based application. Data for use by a thick or thin client implemented on each one of computing device 600 and computing device 601 may be retrieved on-demand by issuing requests to a server remote to each one of computing device 600 and computing device 601. For example, the remote server may store the instructions for the application in a storage device. The remote server may process the stored instructions using circuitry (e.g., control circuitry 604) and generate the displays discussed above and below.

The client device may receive the displays generated by the remote server and may display the content of the displays locally on device 600. This way, the processing of the instructions is performed remotely by the server while the resulting displays (e.g., that may include text, a keyboard, or other visuals) are provided locally on device 600. Device 600 may receive inputs from the user via input interface 610 and transmit those inputs to the remote server for processing and generating the corresponding displays. For example, device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to device 600 for presentation to the user.

In some embodiments, the media application may be downloaded and interpreted or otherwise run by an interpreter or virtual machine (run by control circuitry 604). In some embodiments, the media application may be encoded in the ETV Binary Interchange Format (EBIF), received by control circuitry 604 as part of a suitable feed, and interpreted by a user agent running on control circuitry 604. For example, the media application may be an EBIF application. In some embodiments, the media application may be defined by a series of JAVA-based files that are received and run by a local virtual machine or other suitable middleware executed by control circuitry 604. In some of such embodiments (e.g., those employing MPEG-2, MPEG-4, HEVC or any other suitable digital media encoding schemes), the media application may be, for example, encoded and transmitted in an MPEG-2 object carousel with the MPEG audio and video packets of a program.

As shown in FIG. 7, computing device 706, 707, 708, 710 (which may correspond to, e.g., e.g., computing device 101 and 105 of FIG.; computing device 405 of FIG. 4) may be coupled to communication network 709. Communication network 709 may be one or more networks including the internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 709) may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 7 to avoid overcomplicating the drawing.

Although communications paths are not drawn between user equipment, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The computing device may also communicate with each other directly through an indirect path via communication network 709.

System 700 may comprise media content source 702, one or more servers 704, and/or one or more edge computing devices. In some embodiments, the media application may be executed at one or more of control circuitry 711 of server 704 (and/or control circuitry of computing device 706, 707,

708, 710 and/or control circuitry of one or more edge computing devices). In some embodiments, the media content source and/or server 704 may be configured to host or otherwise facilitate video communication sessions between computing device 706, 707, 708, 710 and/or any other suitable user equipment, and/or host or otherwise be in communication (e.g., over network 709) with one or more social network services.

In some embodiments, server 704 may include control circuitry 711 and storage 714 (e.g., RAM, ROM, Hard Disk, Removable Disk, etc.). Storage 714 may store one or more databases. Server 704 may also include an I/O path 712. I/O path 412 may provide video conferencing data, device information, or other data, over a local area network (LAN) or wide area network (WAN), and/or other content and data to control circuitry 711, which may include processing circuitry, and storage 714. Control circuitry 711 may be used to send and receive commands, requests, and other suitable data using I/O path 712, which may comprise I/O circuitry. I/O path 712 may connect control circuitry 711 (and specifically control circuitry) to one or more communications paths.

Control circuitry 711 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 411 may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 711 executes instructions for an emulation system application stored in memory (e.g., the storage 714). Memory may be an electronic storage device provided as storage 414 that is part of control circuitry 711.

Figure 8:
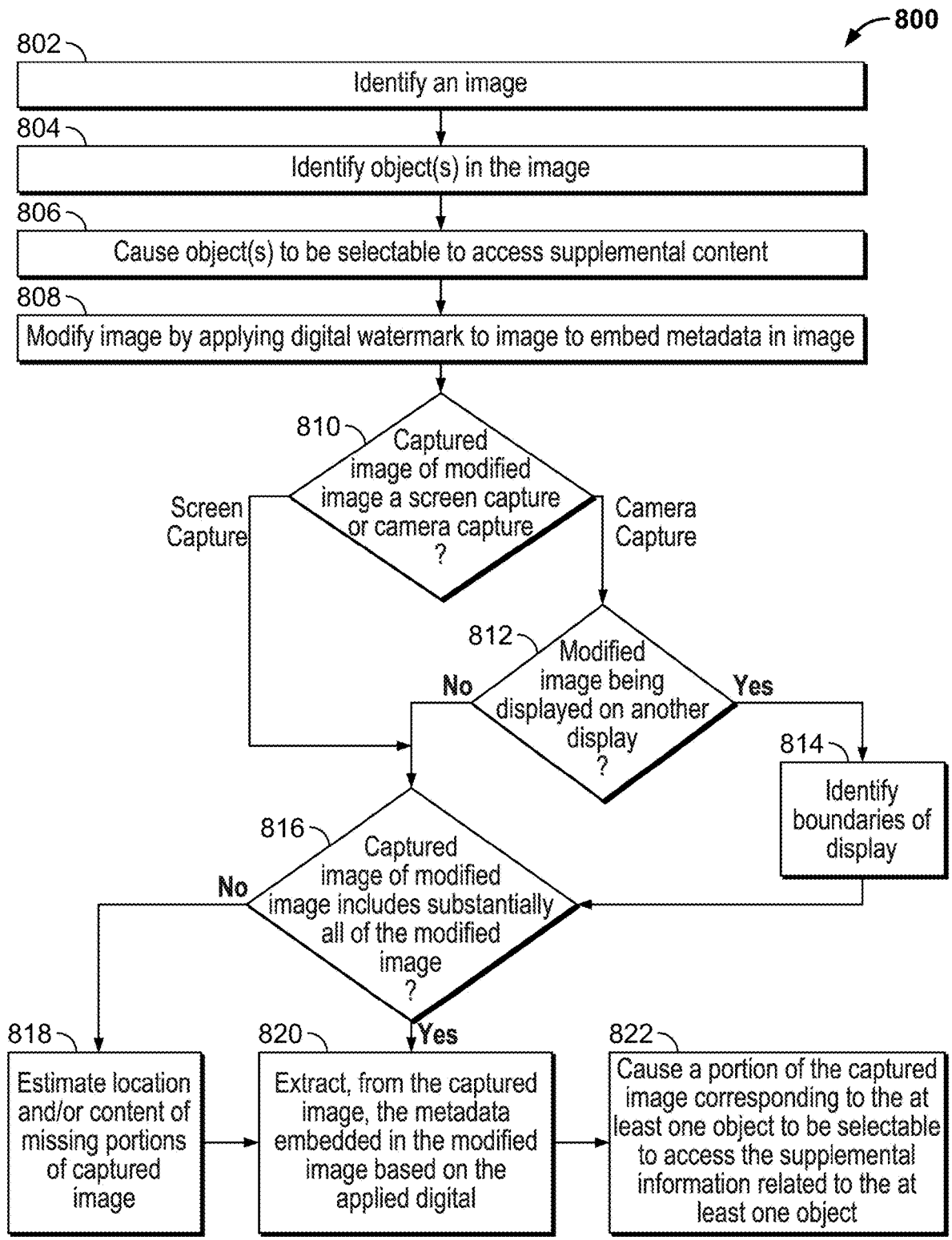
FIG. 8 is a flowchart of an illustrative process for extending selectable object c to a captured image, in accordance with some embodiments of this disclosure.

FIG. 8 is a flowchart of an illustrative process 800 for extending selectable object capability to a captured image, in accordance with some embodiments of this disclosure. In various embodiments, the individual steps of process 800 may be implemented by one or more components of the devices, systems and methods of FIGS. 1-7 and may be performed in combination with any of the other processes and aspects described herein. Although the present disclosure may describe certain steps of process 800 (and of other processes described herein) as being implemented by certain components of the devices, systems and methods of FIGS. 1-7, this is for purposes of illustration only. It should be understood that other components of the devices, systems and methods of FIGS. 1-7 may implement those steps instead.

At 802, control circuitry (e.g., control circuitry 604 of FIG. 6 and/or control circuitry 711 of FIG. 7), and/or I/O circuitry 602 or 712 of FIGS. 6-7, may identify an image (e.g., image or video 100 of FIG. 1). For example, the control circuitry and/or I/O circuitry may access such image over a network (e.g., communication network 709 of FIG. 7 or any other suitable network) from any suitable source (e.g., media content source 702 and/or server 704 of FIG. 7, or any other suitable data source, or any combination thereof). In some embodiments, the control circuitry and/or I/O circuitry may capture an image or video of a real-world environment external to a computing device (e.g., computing device 101 of FIG. 1) to obtain image 100, or perform a screen capture.

Additionally or alternatively, the control circuitry and/or I/O circuitry may access image 100 by generating the image data, and/or retrieving image 100 from memory and/or receiving the image over any suitable data interface, or by accessing image 100 using any other suitable methodology, or any combination thereof. In some embodiments, the control circuitry and/or I/O circuitry may be configured to access, and/or perform processing on, output or transmit, image 100 in response to receiving a user input or a user request, e.g., to access a website, webpage, or application associated with image 100, or to access an electronic message (e.g., a text message, email, notification, or any other suitable electronic message, or any combination thereof).

At 804, the control circuitry may identify one or more objects in the image identified at 802. For example, the control circuitry may identify objects 102, 104, 106, 108, 110 (corresponding to a television, a keyboard, a chair, a plant, and headphones, respectively) in image 100 using any suitable computer-implemented technique (e.g., machine-learning based or heuristic-based techniques). In some embodiments, the image or video may have been pre-analyzed, such that object recognition metadata is cached with the image or video. At 804, the control circuitry may determine or receive information indicative of locations (e.g., coordinates within image 100) of the objects; a classification or type of the objects; an identifier of the objects; a playback position associated with the objects; and/or any other suitable data.

At 806, the control circuitry may cause one or more of the objects identified at 804 to be selectable to access supplemental content. For example, the control circuitry may associate one or more portions of metadata (associated with a particular object) with coordinates and/or pixels of a particular object (e.g., computer display 102) determined at 804, or a bounding box associated with such object, or pixels or coordinates within a certain vicinity of such object, or other icon proximate to the object, in the image (e.g., image 100). For example, a hyperlink or other pointer may be embedded at the coordinates of object 102 such that when object 102 is selected by the user, the control circuitry may cause one or more websites or applications associated with "OfficeMax" and/or "Lenovo" as indicated at 123 and 125, respectively, of FIG. 1 to be accessed (e.g., as an overlay or at another portion of the display of computing device 101 than image 100, or instead of image 100 such as, for example, via a web browser, or using any other suitable display arrangement). In some embodiments, the control circuitry may use a classification of a particular object and/or an identifier of a particular object to identify and/or retrieve relevant supplemental content (e.g., supplemental content 122 of FIG. 1), e.g., based on a web crawl, based on data stored at any suitable database, based on data from any suitable application, based on trending or popular data, based on locally stored data, based on a user profile of a user, or based on any other suitable data, or any combination thereof.

At 808, the control circuitry may modify the image (e.g., image 100 of FIG. 1) by applying a digital watermark (e.g., digital watermark 120 of FIG. 1 which may correspond to digital watermark 204 of FIG. 2) to the image (e.g., image 100 of FIG. 1) to embed and/or encode metadata in the image 100, to obtain modified image 103. For example, the control circuitry may use any suitable algorithm or technique to provide and apply the digital watermark as a marker to embed metadata into a noise-tolerant signal such as, for example, visual (e.g., image or video) data, text data and/or audio data of the image. In some embodiments, this may be understood as caching data (e.g., metadata and/or supplemental content) in the image. In some embodiments, the digital watermark may be invisible or imperceptible to the user such that the watermark data is hidden in the image but nonetheless available for subsequent extraction and/or processing. Alternatively, the watermark may be visible, such that when the image is accessed or played back, the watermark data is displayed on screen, e.g., in an unobtrusive manner.

The digital watermark may be applied to an entirety of image, or any suitable portion(s) thereof, and each digital watermark may be associated with a particular object, or multiple objects, of the image. For example, the control circuitry may reference the locations (e.g., pixels or coordinates) of each object stored in the metadata, and may embed respective digital watermarks for each object at the location in image 100 corresponding to the depiction of the corresponding object. For example, the metadata associated with computer display 102 of FIG. 1 may be embedded via a digital watermark in a local area of computer display 102 of FIG. 1 within modified image 103, e.g., at the same position that computer display 102 is depicted, at a bounding box of computer display 102, and/or in a vicinity or neighboring area thereof.

In some embodiments, the control circuitry may be configured to, in order to embed metadata of multiple objects, segment an image (e.g., image 100 of FIG. 1) into portions so that each segment includes one of multiple objects, and each object belongs to a segment. The control circuitry may then embed the metadata for the object within each corresponding segment. For example, if there are four objects in the top left, top right, bottom left, and bottom right of the image, respectively, the control circuitry can embed appropriate metadata for each particular object within its corresponding segment. In some embodiments, if a partial image is captured or the captured image is zoomed-in (e.g., as shown in FIG. 4), the metadata of the target object can be restored without having to calculate the location of the target object.

At 810, the control circuitry may determine whether a screen capture (e.g., 140 of FIG. 1) of the modified image (e.g., modified image 103 of FIG. 1) has been captured, or whether an image of the modified image (e.g., modified image 103 of FIG. 1) has been captured (e.g., by a camera 138 of computing device 105). In some embodiments, the captured image may be currently displayed at a display screen or otherwise output by a computing device, may be an image printed out on a physical medium, may be a sign or poster, or may be any other suitable image having been modified with the applied digital watermark at 808. If the captured image is a screen capture, processing proceeds to 816; otherwise, processing may proceed to 812.

At 812, having determined that the modified image (e.g., modified image 103) was captured via a camera of a computing device (e.g., computing device 105 of FIG. 1), the control circuitry may determine whether the modified image (e.g., modified image 103 of FIG. 1) was, when captured by the camera, being displayed on another display, e.g., of a computing device other than the camera or computing device that captured the image with camera 138 of FIG. 1. If so, processing proceeds to 814; otherwise processing proceeds to 816.

At 814, having determined that the modified image (e.g., modified image 103) was captured via a camera of a computing device (e.g., computing device 105 of FIG. 1) while the modified image was being displayed on another display (e.g., of computing device 101 of FIG. 1), the control circuitry may identify boundaries of the display. For example, the control circuitry may perform image processing (e.g., edge detection, object recognition, computer vision techniques) on the captured image of the modified image to identify which region of the captured image depicts the display (if any) and which region of the captured image depicts the actual content of the displayed image, and which region (if any) depicts objects or background other than the display or actual content of the displayed image. For example, in the example of FIG. 4, the control circuitry may determine that the captured image corresponds to image 400, which may be a zoomed-in or cropped portion of modified image 103 captured by camera 138 of computing device 105, and may identify corners 402 and 404 (and/or boundaries) of computing device 401 in image 400, and may determine that the perimeter of image 400 depicts the display of computing device 401.

At 816, the control circuitry may determine whether the screen capture or camera capture at 810 depicts substantially all of the modified image (e.g., modified image 103 of FIG. 1). If so, processing may proceed to 820; otherwise processing may proceed to 818. For example, in the case of captured image 400 of FIG. 4, the control circuitry may determine that only two of the four corners of computing device 401 are shown in the captured image, and thus it is likely that portions of the modified image are missing from the captured image. As another example, the control circuitry may determine using any suitable computer-implemented technique that only a portion of an object is being shown in the captured image, and that another portion is likely cut off in the image.

At 818, the control circuitry may estimate the location and/or content of missing portions of modified image (e.g., image 400 of FIG. 4). For example, the embedded metadata associated with the digital watermark may indicate location(s) of object(s) in the original image (e.g., image 100 and/or modified image 103 of FIG. 1), but such indicated location(s) may be in relation to the entire image, and thus may not be accurate in the context of a partial image 400 of image 100. Thus, the control circuitry may, based on the corners 402 and 404 and/or boundaries of the display of computing device 401 identified in image 400 captured by computing device 405, project such captured image 400 to an image depicting a larger and/or normal view of the display (e.g., a full-screen rectangular image, as shown at computing device 105 of FIG. 1). In some embodiments, the control circuitry may estimate the total size of computing device 401, and image 400, to be depicted in the projected image, based on analyzing a size and/or shape of the cropped or zoomed image 400 and the portions of image 400 corresponding to the depiction of computing device 401, and extrapolate the boundaries of such image to generate an estimated full view of the image. The control circuitry may extract the information embedded using the digital watermark (e.g., the coordinates of one or more depicted objects, such as, for example, plant 408, in the original modified image 103) and use such information, together with the projected captured image, to determine the location of object(s) (e.g., plant 408 in image 400) and to provide the selected object functionality intended for such object at such determined location. In some embodiments, step 818 may be optional, e.g., the metadata for plant 408 may be capable of being embedded at a region of the captured image corresponding to or in the vicinity of plant 408, and extracted from such region, without identifying boundaries of a display or estimating missing portions of, or extrapolating, a partial image.

At 820, the control circuitry may extract, from the captured image (e.g., captured image 107 of FIG. 1), the metadata embedded in the modified image based on the applied digital watermark. In the example of FIG. 1, the control circuitry may share or communicate or provide (e.g., provide instructions for executing) the digital watermarking technique or algorithm used at 808 (e.g., implemented at a server or other computing device 101 of FIG. 1) with computing device 105 (or another suitable computing device), to enable metadata to be extracted from modified image 103. At 822, such extraction of metadata may enable the control circuitry to obtain coordinates or other location indications of one or more objects in captured image 107, other parameters of the one or more objects (e.g., position, size and/or shape), a classification or identifier of the one or more objects, or any other suitable data, or any combination thereof. In some embodiments, the control circuitry may provide a user of computing device 101 or 105 with a notification or indication regarding the extracted metadata of captured image 107 and/or regarding the supplemental content accessible by way of selecting one or more of the objects of captured image 107.

At 822, the control circuitry may cause a portion of the captured image corresponding to the at least one object to be selectable to access the supplemental information related to the at least one object. For example, the control circuitry may use metadata, extracted at 820, and having been embedded in modified image 103 using digital watermarking techniques, to restore the selectable object functionality described at 806, without a separate metadata file being provided to computing device 101 or 105 with captured image 107. The selection of an object (e.g., object 102) in captured image 107 to access supplemental content 122 (e.g., a URL with relevant information to the selected object) may be received in any suitable form, e.g., the control circuitry may detect a tap or a swipe or any suitable other gesture on a touchscreen display, a mouse click, a remote control input, biometric input, voice input, haptic input, or any other suitable input, or any combination thereof.

In some embodiments, such image captured at 810 (the modified image at 808) can be further shared (e.g., posted to social media or communicated to another user) while retaining the applied digital watermark, and may be extracted by other computing devices and/or users that access the captured image. In some embodiments, halos or other indicators may be shown at or around a depiction of a particular object, to indicate and signal to one or more users that such object is selectable to access supplemental content.

In some embodiments, while FIG. 8 describes processing in relation to obtaining a captured image (e.g., captured image 107 of FIG. 1) of the modified image (e.g., modified image 107), the control circuitry may be configured to obtain such modified image (e.g., that includes a digital watermark that embeds metadata associated with at least one object in the image, and wherein the metadata comprises an indication of a location of the at least one object in the image) in any other suitable manner. For example, the control circuitry may obtain the modified image via the Internet, via an electronic message (e.g., from a friend that took a screenshot or captured an image of the modified image, or from a friend that otherwise obtained the modified image), via storage, or via any other suitable mechanism, or any combination thereof.

In some embodiments, a variety of different applications, entities, systems, or platforms may be configured to perform steps 802-822, or any suitable portion thereof. For example, a content provider (e.g., media content source 702) may be configured to generate image 100 and/or enable certain objects in image 100 to be selectable to access supplemental content, and/or may apply the digital watermark to image 100 to embed metadata in image 100 (or a separate entity may perform the digital watermarking) to generate modified image 103, at steps 802-808. As another example, a client side application (e.g., at computing device 105) may be configured to obtain modified image 103 (e.g., via the Internet or via an electronic message or via any other suitable mechanism) at 132, and/or may be configured to obtain captured image 107 (e.g., via a camera of computing device 105 and/or via an application native to the operating system of computing device 105 and/or via a third-party application installed at computing device 105, and/or via a screen shot captured at computing device 105), and perform the processing of steps 810-822. In some embodiments, the same or different client-side application (and/or a server-side application) may be configured to perform 820 to extract, based on the digital watermark, the embedded metadata, and based on the extracted metadata, cause a portion of the image corresponding to the location of the at least one object in the image to be selectable to access supplemental information related to the at least one object. In some embodiments, the control circuitry may comprise various control circuitries present throughout the ecosystem of such different applications, entities, systems, or platforms, or any suitable portion(s) thereof, e.g., the content provider and/or the client-side device configured to obtain modified image 103 and/or a captured image of modified image 103 and/or extract metadata from such image, for use to access supplemental information related to the at least one object.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method comprising:
   obtaining an image, wherein obtaining the image comprises capturing the image using a camera;
   determining that the image is a captured image of content being displayed on a display of a device, wherein the captured image includes a digital watermark that embeds metadata associated with at least one object in the content, and wherein the metadata comprises an indication of a location of the at least one object in the content;
   identifying, in the captured image, boundaries of the display;
   extracting, based on the digital watermark, the embedded metadata;
   based on the extracted metadata and the identified boundaries of the display, determining a location of the at least one object in the captured image; and based on the extracted metadata, causing a portion of the captured image corresponding to the location of the at least one object in the captured image to be selectable to access supplemental information related to the at least one object.

2. The method of claim 1, wherein determining the location of the at least one object in the captured image further comprises:
projecting, based on the identified boundaries of the display, the captured image to an image depicting a larger portion of the display than the captured image; and
determining the location of the at least one object in the captured image based at least in part on the image depicting the larger portion of the display than the captured image.

3. The method of claim 1, wherein:
the at least one object is a particular object, and the content comprises a plurality of objects including the particular object; and for each respective object of the plurality of objects, a digital watermark embeds metadata at a portion of the content that is in a vicinity of a location of the respective object in the content, and the metadata comprises an indication of a location of the respective object of the plurality of objects; and
extracting the embedded metadata comprises extracting only the embedded metadata associated with the particular object.

4. The method of claim 1, wherein:
the at least one object is a particular object, and the content comprises a plurality of objects including the particular object; and for each respective object of the plurality of objects, a digital watermark embeds metadata at a portion of the content that is in a vicinity of a location of the respective object in the content, and the metadata comprises an indication of a location of the respective object of the plurality of objects; and
the captured image comprises a zoomed-in portion of the content that depicts at least a portion of the particular object and that does not depict the other objects of the plurality of objects included in the content.

5. The method of claim 4, further comprising:
determining the location of the at least one object in the captured image at least in part by:
accessing the supplemental information related to the particular object to determine a type of the particular object; and
performing image processing on the captured image to identify an object that corresponds to the determined type as the particular object.

6. The method of claim 1, wherein:
the metadata further comprises parental control information related to the content;
the content is included in a video, and the captured image is included in a captured recording of the video;
extracting the metadata further comprises extracting the parental control information; and
the method further comprises determining whether to permit playback of the recording of the video based on the extracted parental control information.

7. A computer-implemented method comprising:
identifying an image comprising at least one object, wherein a portion of the image corresponding to the at least one object is selectable to access supplemental information related to the at least one object; and
modifying the image by applying a digital watermark to the image to cause metadata to be embedded into the image, wherein the metadata comprises an indication of a location of the at least one object in the image, and wherein the modifying of the image is performed prior to encoding the modified image and prior to transmitting or storing the modified image, and wherein modifying the image enables:
extracting, from a captured image of the modified image captured using a camera or based on a screen capture of the modified image, the metadata embedded in the modified image based on the applied digital watermark; and
based on the metadata extracted from the captured image, causing a portion of the captured image corresponding to the at least one object to be selectable to access the supplemental information related to the at least one object.

8. The method of claim 7, wherein the metadata further comprises a uniform resource locator (URL) that is selectable to access the supplemental information.

9. The method of claim 7, wherein an indication of the applied digital watermark is not visible in the modified image.

10. The method of claim 7, wherein the at least one object is a particular object, and the image comprises a plurality of objects including the particular object, and the method further comprises:
modifying the image by applying a plurality of digital watermarks to the image to cause metadata to be embedded at a plurality of portions the image, wherein for each respective object of the plurality of objects, metadata is embedded at a portion of the image that is in a vicinity of a location of the respective object in the image, and the metadata comprises an indication of a location of the respective object of the plurality of objects.

11. The method of claim 7, wherein the image is included in a video, and applying the digital watermark to the video further comprises causing at least a portion of the metadata to be embedded in audio information of the video.

12. The method of claim 7, further comprising:
identifying a discrepancy between a portion of the image and information in the supplemental information that is related to the portion of the image; and
based on the identified discrepancy, replacing the portion of the captured image with the information in the supplemental information that is related to the portion of the image.

13. A system comprising:
input/output circuitry configured to:
obtain an image, wherein obtaining the image comprises capturing the image using a camera;
determine that the image is a captured image of content being displayed on a display of a device, wherein the image includes a digital watermark that embeds metadata associated with at least one object in the content, and wherein the metadata comprises an indication of a location of the at least one object in the content; and
control circuitry configured to:
identify, in the captured image, boundaries of the display;
extract, based on the digital watermark, the embedded metadata;
based on the extracted metadata and the identified boundaries of the display, determine a location of the at least one object in the captured image; and based on the extracted metadata, cause a portion of the captured image corresponding to the location of the at least one object in the captured image to be selectable to access supplemental information related to the at least one object.

14. The system of claim 13, wherein the control circuitry is configured to determine the location of the at least one object in the captured image by:
projecting, based on the identified boundaries of the display, the captured image to an image depicting a larger portion of the display than the captured image; and
determining the location of the at least one object in the captured image based at least in part on the image depicting the larger portion of the display than the captured image.

15. The system of claim 13, wherein:
the at least one object is a particular object, and the content comprises a plurality of objects including the particular object; and for each respective object of the plurality of objects, a digital watermark embeds metadata at a portion of the content that is in a vicinity of a location of the respective object in the content, and the metadata comprises an indication of a location of the respective object of the plurality of objects; and
the control circuitry is configured to extract the embedded metadata by extracting only the embedded metadata associated with the particular object.

16. The system of claim 13, wherein:
the at least one object is a particular object, and the content comprises a plurality of objects including the particular object; and for each respective object of the plurality of objects, a digital watermark embeds metadata at a portion of the content that is in a vicinity of a location of the respective object in the content, and the metadata comprises an indication of a location of the respective object of the plurality of objects; and
the captured image comprises a zoomed-in portion of the content that depicts at least a portion of the particular object and that does not depict the other objects of the plurality of objects included in the content.

17. The system of claim 16, wherein the control circuitry is further configured to:
determine the location of the at least one object in the captured image at least in part by:
accessing the supplemental information related to the particular object to determine a type of the particular object; and
performing image processing on the captured image to identify an object that corresponds to the determined type as the particular object.

18. The system of claim 13, wherein:
the control circuitry is configured to obtain the image by obtaining the captured image of the image using the camera or based on a screen capture;
the metadata further comprises parental control information related to the content image;
the image content is included in a video, and the captured image is included in a captured recording of the video;
the control circuitry is configured to extract the metadata by extracting the parental control information; and
the control circuitry is further configured to determine whether to permit playback of the recording of the video based on the extracted parental control information.

19. The system of claim 13, wherein an indication of the applied digital watermark is not visible in the modified image.

20. The system of claim 13, wherein the extracted metadata comprises a uniform resource locator (URL) that enables the access the supplemental information related to the at least one object.

* * * * *